(12) United States Patent
Desai et al.

(10) Patent No.: US 9,350,644 B2
(45) Date of Patent: May 24, 2016

(54) SECURE AND LIGHTWEIGHT TRAFFIC FORWARDING SYSTEMS AND METHODS TO CLOUD BASED NETWORK SECURITY SYSTEMS

(71) Applicants: Purvi Desai, Cupertino, CA (US); Vikas Mahajan, Ludhiana (IN); Abhinav Bansal, Jalandhar (IN)

(72) Inventors: Purvi Desai, Cupertino, CA (US); Vikas Mahajan, Ludhiana (IN); Abhinav Bansal, Jalandhar (IN)

(73) Assignee: Zscaler, Inc., San Jose, CA (US)

( * ) Notice: Subject to any disclaimer, the term of this patent is extended or adjusted under 35 U.S.C. 154(b) by 0 days.

(21) Appl. No.: 14/560,609

(22) Filed: Dec. 4, 2014

(65) Prior Publication Data

US 2015/0143504 A1 May 21, 2015

Related U.S. Application Data

(63) Continuation-in-part of application No. 14/461,790, filed on Aug. 18, 2014, and a continuation-in-part of application No. 13/446,856, filed on Apr. 13, 2012, now Pat. No. 9,118,689.

(51) Int. Cl.
| | |
|---|---|
| *H04L 12/721* | (2013.01) |
| *H04W 12/12* | (2009.01) |
| *H04L 29/06* | (2006.01) |
| *H04L 12/26* | (2006.01) |
| *H04W 12/08* | (2009.01) |
| *G06F 9/00* | (2006.01) |

(52) U.S. Cl.
CPC ............ *H04L 45/14* (2013.01); *H04L 43/10* (2013.01); *H04L 63/0245* (2013.01); *H04W 12/12* (2013.01); *H04W 12/08* (2013.01)

(58) Field of Classification Search
CPC ..... H04L 45/14; H04L 63/0245; H04L 43/10; H04L 12/26; H04W 12/12
See application file for complete search history.

(56) References Cited

U.S. PATENT DOCUMENTS

| | | | | |
|---|---|---|---|---|
| 5,696,898 | A * | 12/1997 | Baker | G06F 21/604 707/999.009 |
| 6,088,796 | A * | 7/2000 | Cianfrocca | G06F 17/3089 707/999.009 |
| 7,069,326 | B1 * | 6/2006 | Bush | H04L 12/5695 709/220 |
| 8,281,377 | B1 * | 10/2012 | Snow | H04N 21/41407 726/11 |
| 8,966,112 | B1 * | 2/2015 | Franke | H04L 69/321 370/229 |
| 9,183,065 | B1 * | 11/2015 | Shanker | G06F 9/544 |
| 2004/0003290 | A1 * | 1/2004 | Malcolm | H04L 63/029 726/14 |
| 2006/0047824 | A1 * | 3/2006 | Bowler | H04L 63/0236 709/229 |
| 2006/0075478 | A1 * | 4/2006 | Hyndman | H04L 63/0218 726/11 |
| 2006/0168149 | A1 * | 7/2006 | Dispensa | H04L 29/12009 709/219 |
| 2007/0147380 | A1 * | 6/2007 | Ormazabal | H04L 29/06027 370/392 |

(Continued)

*Primary Examiner* — Darren B Schwartz
(74) *Attorney, Agent, or Firm* — Clements Bernard PLLC; Lawrence A. Baratta, Jr.; Christopher L. Bernard

(57) ABSTRACT

A method implemented by an agent operating on a mobile device communicating to a cloud-based system includes opening up local listening sockets on the mobile device; redirecting outgoing traffic from all application on the mobile device except the agent to the local listening sockets; and forwarding the outgoing traffic from the local listening sockets to the cloud-based system with additional information included therein for the cloud-based system.

18 Claims, 22 Drawing Sheets

(56) References Cited

U.S. PATENT DOCUMENTS

| | | | | |
|---|---|---|---|---|
| 2008/0115190 A1* | 5/2008 | Aaron | ............... | H04L 63/102 726/1 |
| 2009/0007251 A1* | 1/2009 | Abzarian | ............ | H04L 63/029 726/11 |
| 2009/0113540 A1* | 4/2009 | Chandwani | ......... | H04L 63/0227 726/13 |
| 2009/0282471 A1* | 11/2009 | Green | ............... | H04L 63/029 726/12 |
| 2010/0088423 A1* | 4/2010 | Mazzagatte | ............ | H04L 63/08 709/229 |
| 2011/0276702 A1* | 11/2011 | Marchev | ............... | H04L 63/029 709/228 |
| 2012/0079122 A1* | 3/2012 | Brown | ............ | H04L 12/4641 709/227 |
| 2012/0102151 A1* | 4/2012 | Souza | ............ | H04L 69/14 709/217 |
| 2013/0007095 A1* | 1/2013 | Knox | ............ | G06F 9/54 709/202 |

* cited by examiner

| | |
|---|---|
| Add new Mobile policy for Zscaler Secure Agent. Only one policy is active at a time. Please ensure that desired policy is published. | |
| Policy Name | My Config |
| Description | Config limiting quota to 2MB |
| PAC URL | http://pac.zscaler.net/zscaler.net/proxy.pac |
| Logout Password | 1234 |
| Uninstall Password | 1234 |
| Install Zscaler SSL Root Certs | ☑ |
| Enforce Quota on Cellular Network | ☑ |
| Wifi SSID (Used to simulate 3G) | zchd |
| Quota in MB | 15 |
| Billing day of each month | 24 |
| Whitelisted applications which are allowed on cellular network even after quota has exceeded | com.sec.android.widgetapp.diotek.smemo<br>com.android.email<br>com.android.mms |
| User block notification | Blocked! |

FIG. 14

SECURE AND LIGHTWEIGHT TRAFFIC FORWARDING SYSTEMS AND METHODS TO CLOUD BASED NETWORK SECURITY SYSTEMS

CROSS-REFERENCE TO RELATED APPLICATIONS

This application is a continuation-in-part of co-pending U.S. patent application Ser. No. 14/461,790 filed Aug. 18, 2014, and entitled "OUT OF BAND END USER NOTIFICATION SYSTEMS AND METHODS FOR SECURITY EVENTS RELATED TO NON-BROWSER MOBILE APPLICATIONS" and U.S. patent application Ser. No. 13/446,856 filed Apr. 13, 2012, and entitled "ARCHIVING SYSTEMS AND METHODS FOR CLOUD BASED SYSTEMS," the contents of which are incorporated in full by reference herein.

FIELD OF THE DISCLOSURE

The present disclosure relates generally to computer networking systems and methods. More particularly, the present disclosure relates to secure and lightweight traffic forwarding mechanisms to cloud based network security systems.

BACKGROUND OF THE DISCLOSURE

Conventional web and Domain Name System (DNS) cloud based network security solutions have problems associated with traffic forwarding, user authentication, device validation, and application identification on mobile operating systems. In the past, a majority of the web traffic was generated by browser based applications that were compliant with Hypertext Transfer Protocol (HTTP) protocol standards in its entirety. With the proliferation of mobile applications ("apps"), traffic-forwarding mechanisms have faced numerous challenges. Mobile apps are purposely built to talk to dedicated servers using mechanisms that may not be proxy friendly, may not handle HTTP redirections or may not support authentication cookies. Traditional browser based web transactions have a user agent as a source identifier, but not all mobile apps support unique user agents. Similarly, a DNS request does not have any application or user authentication information. Solutions other than proxy, such as those that incorporate Secure Sockets Layer (SSL) or Internet Protocol Security (IPsec) Virtual Private Network (VPN) as a traffic forwarding mechanism, can handle authentication for all traffic, but lack the scalability and computational efficiency as afforded by proxy based solutions. Further, conventional approaches do not provide a way for secure web gateways to identify a source application package and lack the capacity to enforce application specific organizational policies, such as blocking social networking apps. Additionally, conventional traffic forwarding solutions do not offer a way to locally apply device specific policies, like bandwidth control, that is beneficial to apply locally as request bytes going to cloud would cumulate from all devices. The conventional solutions also often lack the scalability and the ability required for supporting BYOD (bring your own device) model wherein only partial or containerized traffic is forwarded to a secure web gateway. Lastly, conventional methods do not offer the capacity to generate security notifications in case of locally defined device level policy violations and need re-routing to operating system specific push notification services.

BRIEF SUMMARY OF THE DISCLOSURE

In an exemplary embodiment, a method implemented by an agent operating on a mobile device communicating to a cloud-based system includes opening up local listening sockets on the mobile device; redirecting outgoing traffic from all application on the mobile device except the agent to the local listening sockets; and forwarding the outgoing traffic from the local listening sockets to the cloud-based system with additional information included therein for the cloud-based system. The local listening sockets can be a Transmission Control Protocol (TCP) listening socket for Web traffic and a User Datagram Protocol (UDP) listening socket for Domain Name System (DNS) traffic. The redirecting outgoing traffic can include using an Internet Protocol (IP) tables, firewall rules-based approach where the agent configures firewall rules to reroute the outgoing traffic to the local listening sockets. The redirecting outgoing traffic can include using a tunnel interface approach using a tunnel interface to reroute the outgoing traffic to the local listening sockets. The method can further include applying local policies at the mobile device, through the agent, prior to forwarding the outgoing traffic. The cloud-based system can be configured to apply remote policies subsequent to the forwarding the outgoing traffic. The method can further include blocking an outgoing request based on the outgoing traffic based on the local policies and displaying a locally generated end user notification. The local policies can include bandwidth quota limits. The additional information can include any of app unique package name, app version, operating system version, device model, and agent app version.

In another exemplary embodiment, a mobile device includes a network interface communicatively coupled to a network, a processor communicatively coupled to the network interface, and memory storing instructions that when executed cause the processor to: open up local listening sockets on the mobile device; redirect outgoing traffic from all application on the mobile device except the agent to the local listening sockets; and forward the outgoing traffic from the local listening sockets to a cloud-based system with additional information included therein for the cloud-based system.

In yet another exemplary embodiment, a cloud-based security system includes one or more cloud nodes communicatively coupled to a network; wherein each of the one or more cloud nodes is configured to: receive outgoing traffic from local listening sockets at a mobile device with additional information included therein, wherein the outgoing traffic is received subsequent to having local policies applied at the mobile device; and apply remote policies on the outgoing traffic, wherein the outgoing traffic is either Web traffic or Domain Name System (DNS) traffic from the mobile device.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1 is a network diagram of a distributed security system, and the like;

FIG. 14 is a screen diagram illustrates an exemplary UI for the secure and lightweight tunnel configuration;

DETAILED DESCRIPTION OF THE DISCLOSURE

In various exemplary embodiments, secure and lightweight traffic forwarding systems and methods are described to cloud based network security systems. The traffic forwarding systems and methods provide lightweight and secure traffic forwarding tunnels to cloud based network security systems (for Web and DNS). Traffic (Web and DNS) from a device, including all or containerized apps, can be routed through this tunnel. The tunnel handles proxy authentication transparently for all warranted apps and sends an application identifier with transactions for the cloud based network security systems to identify the app and apply application specific security policies. Further, wherever beneficial (like limiting mobile data quota per app), a tunnel app can apply policies locally and generate security notifications locally for those events. The tunnel is a convenient mechanism to handle mobile app data and the like that is moving away from the HTTP protocol. The systems and methods provide a secure and a lightweight solution to forward Web and DNS traffic to a cloud based security and policy enforcement system, a way for a secure web gateway to identify application associated with a (Web and DNS) transaction correctly, transparently handles cloud custom authentication scheme for all apps, and can apply some policies locally (like 3G quota enforcement) to save bandwidth with locally generated notification for those transactions.

§1.0 Example High Level System Architecture—Cloud-based Security System

Figure 1:
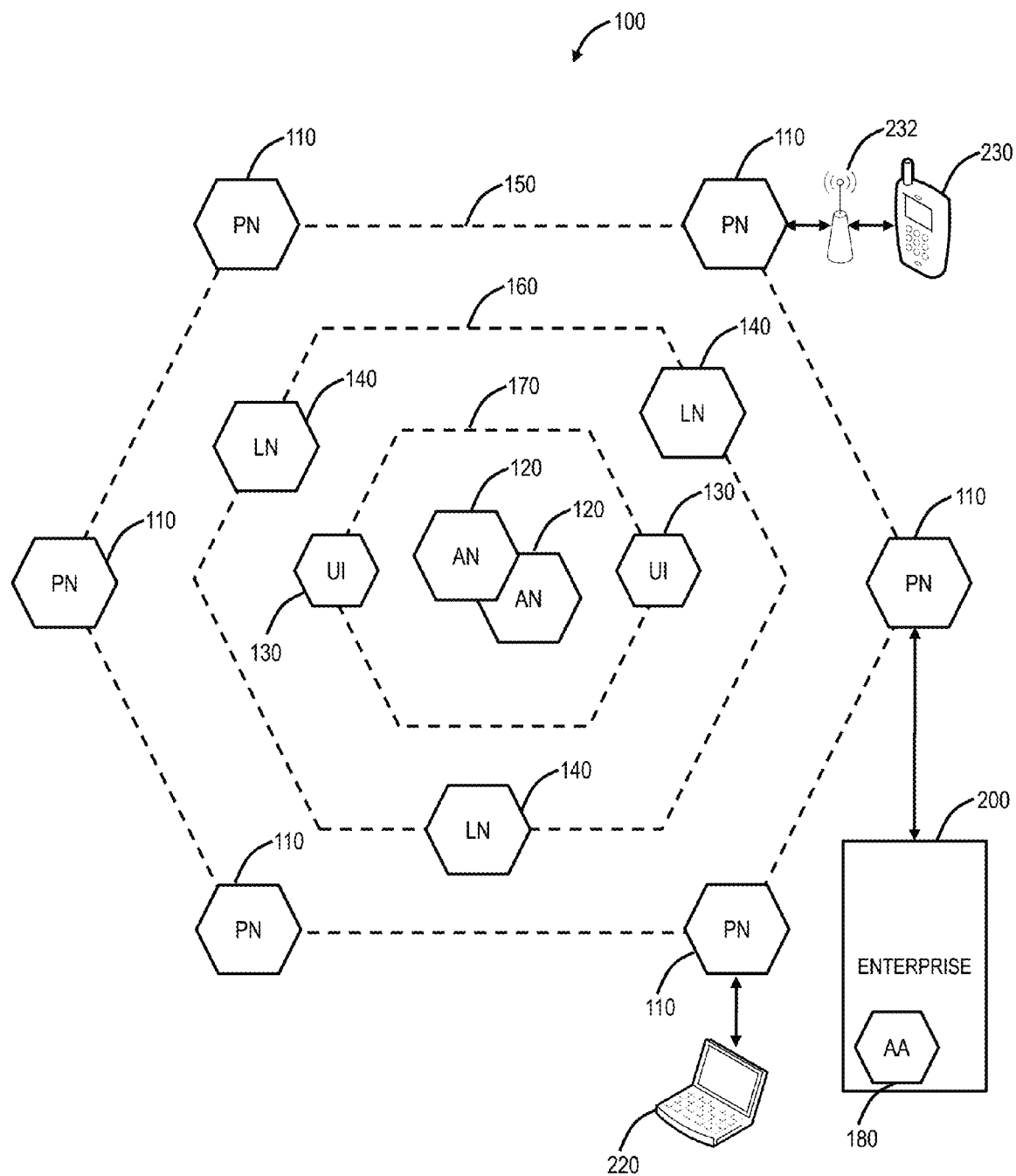

Referring to FIG. 1, in an exemplary embodiment, a block diagram illustrates a distributed security system 100. The system 100 may, for example, be implemented as an overlay network in a wide area network (WAN), such as the Internet, a local area network (LAN), or the like. The system 100 includes content processing nodes (PN) 110, that proactively detect and preclude the distribution of security threats, e.g., malware, spyware, viruses, email spam, etc., and other undesirable content sent from or requested by an external system. The processing nodes 110 can also log activity and enforce policies. Example external systems may include an enterprise 200, a computer device 220, and a mobile device 230, or other network and computing systems communicatively coupled to the system 100. In an exemplary embodiment, each of the processing nodes 110 may include a decision system, e.g., data inspection engines that operate on a content item, e.g., a web page, a file, an email message, or some other data or data communication that is sent from or requested by one of the external systems. In an exemplary embodiment, all data destined for or received from the Internet is processed through one of the processing nodes 110. In another exemplary embodiment, specific data specified by each external system, e.g., only email, only executable files, etc., is process through one of the processing node 110.

Each of the processing nodes 110 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an exemplary embodiment, the threat classification may be reduced to a subset of categories e.g., violating, non-violating, neutral, unknown. Based on the subset classification, the processing node 110 may allow distribution of the content item, preclude distribution of the content item, allow distribution of the content item after a cleaning process, or perform threat detection on the content item. In an exemplary embodiment, the actions taken by one of the processing nodes 110 may be determinative on the threat classification of the content item and on a security policy of the external system to which the content item is being sent from or from which the content item is being requested by. A content item is violating if, for any part C=[c1, c2, . . . , cm] of the content item, at any of the processing nodes 110, any one of the data inspection engines generates an output that results in a classification of "violating."

Figure 3:
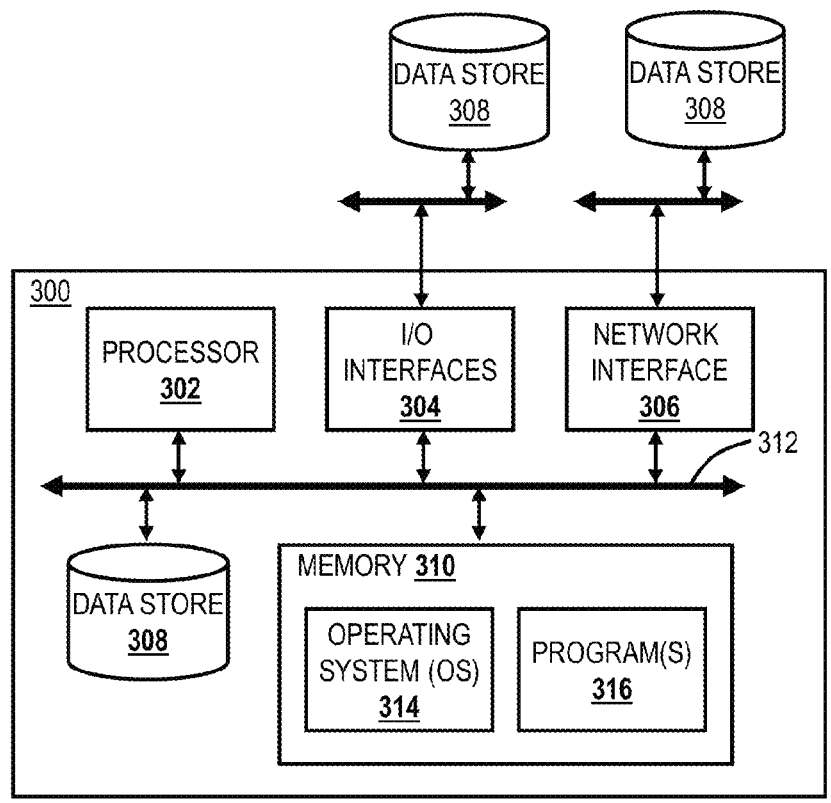
FIG. 3 is a block diagram of a server which may be used in the distributed security system of FIG. 1 or standalone.

Each of the processing nodes 110 may be implemented by one or more of computer and communication devices, e.g., server computers, gateways, switches, etc., such as the server 300 described in FIG. 3. In an exemplary embodiment, the processing nodes 110 may serve as an access layer 150. The access layer 150 may, for example, provide external system access to the security system 100. In an exemplary embodiment, each of the processing nodes 110 may include Internet gateways and one or more servers, and the processing nodes 110 may be distributed through a geographic region, e.g., throughout a country, region, campus, etc. According to a service agreement between a provider of the system 100 and an owner of an external system, the system 100 may thus provide security protection to the external system at any location throughout the geographic region.

Data communications may be monitored by the system 100 in a variety of ways, depending on the size and data requirements of the external system. For example, an enterprise 200 may have multiple routers, switches, etc. that are used to communicate over the Internet, and the routers, switches, etc. may be configured to establish communications through the nearest (in traffic communication time, for example) processing node 110. A mobile device 230 may be configured to communicated to a nearest processing node 110 through any available wireless access device, such as an access point, or a cellular gateway. A single computer device 220, such as a consumer's personal computer, may have its browser and email program configured to access the nearest processing node 110, which, in turn, serves as a proxy for the computer device 220. Alternatively, an Internet provider may have all of its customer traffic processed through the processing nodes 110.

In an exemplary embodiment, the processing nodes 110 may communicate with one or more authority nodes (AN) 120. The authority nodes 120 may store policy data for each external system and may distribute the policy data to each of the processing nodes 110. The policy may, for example, define security policies for a protected system, e.g., security policies for the enterprise 200. Example policy data may define access privileges for users, web sites and/or content that is disallowed, restricted domains, etc. The authority nodes 120 may distribute the policy data to the access nodes 110. In an exemplary embodiment, the authority nodes 120 may also distribute threat data that includes the classifications of content items according to threat classifications, e.g., a list of known viruses, a list of known malware sites, spam email domains, a list of known phishing sites, etc. The distribution of threat data between the processing nodes 110 and the authority nodes 120 may implemented by push and pull distribution schemes described in more detail below. In an exemplary embodiment, each of the authority nodes 120 may be implemented by one or more computer and communication devices, e.g., server computers, gateways, switches, etc., such as the server 300 described in FIG. 3. In some exemplary embodiments, the authority nodes 120 may serve as an application layer 160. The application layer 160 may, for example, manage and provide policy data, threat data, and data inspection engines and dictionaries for the processing nodes 110.

Other application layer functions may also be provided in the application layer 170, such as a user interface (UI) front-end 130. The user interface front-end 130 may provide a user interface through which users of the external systems may provide and define security policies, e.g., whether email traffic is to be monitored, whether certain web sites are to be precluded, etc. Another application capability that may be provided through the user interface front-end 130 is security analysis and log reporting. The underlying data on which the security analysis and log reporting functions operate are stored in logging nodes (LN) 140, which serve as a data logging layer 160. Each of the logging nodes 140 may store data related to security operations and network traffic processed by the processing nodes 110 for each external system. In an exemplary embodiment, the logging node 140 data may be anonymized so that data identifying an enterprise is removed or obfuscated. For example, identifying data may be removed to provide an overall system summary of security processing for all enterprises and users without revealing the identity of any one account. Alternatively, identifying data may be obfuscated, e.g., provide a random account number each time it is accessed, so that an overall system summary of security processing for all enterprises and users may be broken out by accounts without revealing the identity of any one account. In another exemplary embodiment, the identifying data and/or logging node 140 data may be further encrypted, e.g., so that only the enterprise (or user if a single user account) may have access to the logging node 140 data for its account. Other processes of anonymizing, obfuscating, or securing logging node 140 data may also be used.

In an exemplary embodiment, an access agent 180 may be included in the external systems. For example, the access agent 180 is deployed in the enterprise 200. The access agent 180 may, for example, facilitate security processing by providing a hash index of files on a client device to one of the processing nodes 110, or may facilitate authentication functions with one of the processing nodes 110, e.g., by assigning tokens for passwords and sending only the tokens to a processing node so that transmission of passwords beyond the network edge of the enterprise is minimized. Other functions and processes may also be facilitated by the access agent 180. In an exemplary embodiment, the processing node 110 may act as a forward proxy that receives user requests to external servers addressed directly to the processing node 110. In another exemplary embodiment, the processing node 110 may access user requests that are passed through the processing node 110 in a transparent mode. A protected system, e.g., enterprise 200, may, for example, choose one or both of these modes. For example, a browser may be configured either manually or through the access agent 180 to access the processing node 110 in a forward proxy mode. In the forward proxy mode, all accesses are addressed to the processing node 110.

In an exemplary embodiment, an enterprise gateway may be configured so that user requests are routed through the processing node 110 by establishing a communication tunnel between enterprise gateway and the processing node 110. For establishing the tunnel, existing protocols such as generic routing encapsulation (GRE), layer two tunneling protocol (L2TP), or other Internet Protocol (IP) security protocols may be used. In another exemplary embodiment, the processing nodes 110 may be deployed at Internet service provider (ISP) nodes. The ISP nodes may redirect subject traffic to the processing nodes 110 in a transparent proxy mode. Protected systems, such as the enterprise 200, may use a multiprotocol label switching (MPLS) class of service for indicating the subject traffic that is to be redirected. For example, at the within the enterprise the access agent 180 may be configured to perform MPLS labeling. In another transparent proxy mode exemplary embodiment, a protected system, such as the enterprise 200, may identify the processing node 110 as a next hop router for communication with the external servers.

Generally, the distributed security system 100 may generally refer to an exemplary cloud-based security system. Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser, with no installed client version of an application required. Centralization gives cloud service providers complete control over the versions of the browser-based applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The distributed security system 100 is illustrated herein as one exemplary embodiment of a cloud-based system, and those of ordinary skill in the art will recognize the cloud based mobile device security and policy systems and methods contemplate operation on any cloud based system.

§2.0 Example Detailed System Architecture and Operation

Figure 2:
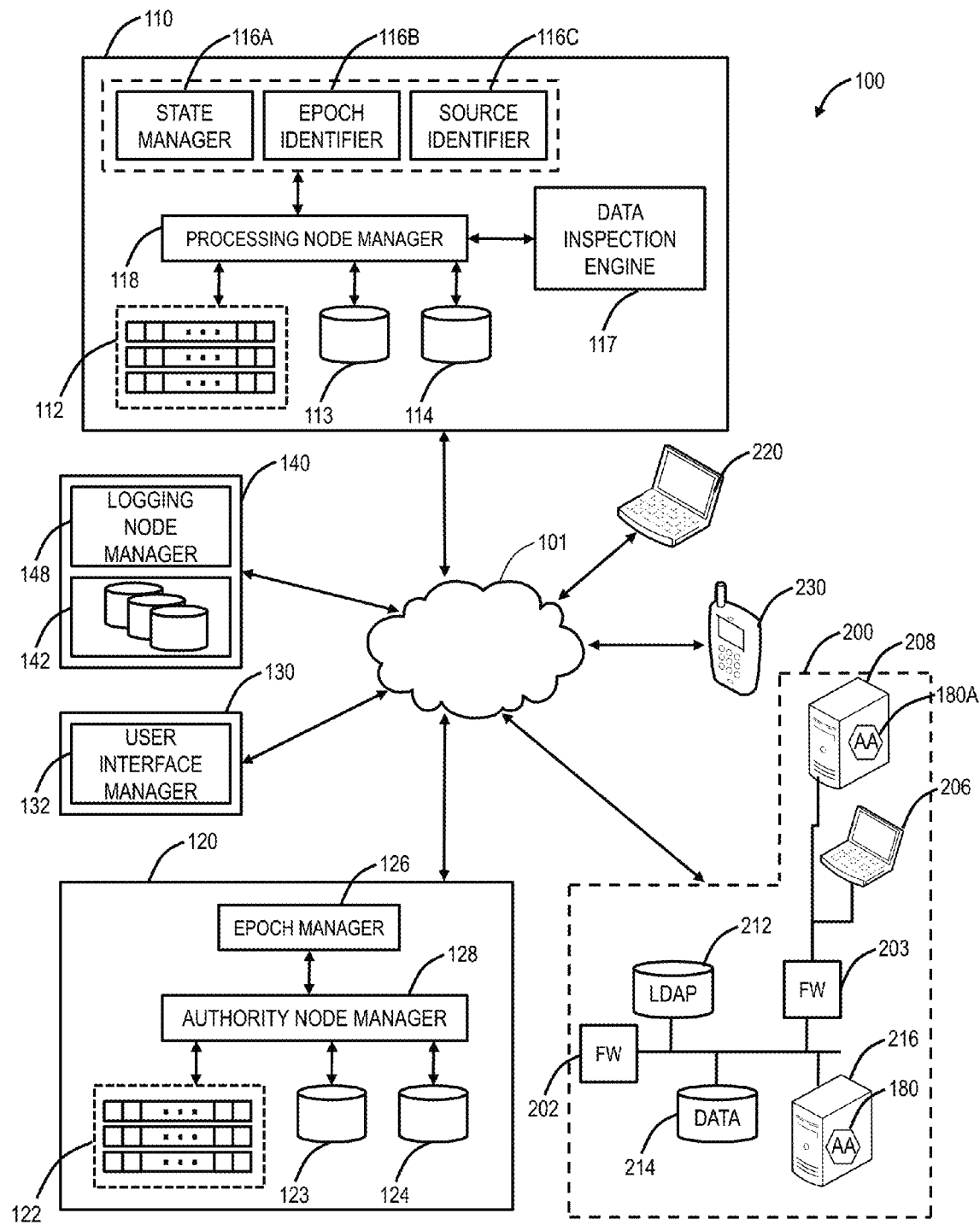
FIG. 2 is a network diagram of the distributed security system of FIG. 1 illustrating various components in more detail.

Referring to FIG. 2, in an exemplary embodiment, a block diagram illustrates various components of the distributed security system 100 in more detail. Although FIG. 2 illustrates only one representative component processing node 110, authority node 120 and logging node 140, those of ordinary skill in the art will appreciate there may be many of each of the component nodes 110, 120 and 140 present in the system 100. A wide area network (WAN) 101, such as the Internet, or some other combination of wired and/or wireless networks, communicatively couples the processing node 110, the authority node 120, and the logging node 140 therebetween. The external systems 200, 220 and 230 likewise communicate over the WAN 101 with each other or other data providers and publishers. Some or all of the data communication of each of the external systems 200, 220 and 230 may be processed through the processing node 110.

FIG. 2 also shows the enterprise 200 in more detail. The enterprise 200 may, for example, include a firewall (FW) 202 protecting an internal network that may include one or more enterprise servers 216, a lightweight directory access protocol (LDAP) server 212, and other data or data stores 214. Another firewall 203 may protect an enterprise subnet that can include user computers 206 and 208 (e.g., laptop and desktop computers). The enterprise 200 may communicate with the WAN 101 through one or more network devices, such as a router, gateway, switch, etc. The LDAP server 212 may store, for example, user login credentials for registered users of the enterprise 200 system. Such credentials may include a user identifiers, login passwords, and a login history associated with each user identifier. The other data stores 214 may include sensitive information, such as bank records, medical records, trade secret information, or any other information warranting protection by one or more security measures.

In an exemplary embodiment, a client access agent 180*a* may be included on a client computer 208. The client access agent 180*a* may, for example, facilitate security processing by providing a hash index of files on the user computer 208 to a processing node 110 for malware, virus detection, etc. Other security operations may also be facilitated by the access agent 180*a*. In another exemplary embodiment, a server access agent 180 may facilitate authentication functions with the processing node 110, e.g., by assigning tokens for passwords and sending only the tokens to the processing node 110 so that transmission of passwords beyond the network edge of the enterprise 200 is minimized. Other functions and processes may also be facilitated by the server access agent 180*b*. The computer device 220 and the mobile device 230 may also store information warranting security measures, such as personal bank records, medical information, and login information, e.g., login information to the server 206 of the enterprise 200, or to some other secured data provider server. The computer device 220 and the mobile device 230 can also store information warranting security measures, such as personal bank records, medical information, and login information, e.g., login information to a server 216 of the enterprise 200, or to some other secured data provider server.

§2.1 Example Processing Node Architecture

In an exemplary embodiment, the processing nodes 110 are external to network edges of the external systems 200, 220 and 230. Each of the processing nodes 110 stores security policies 113 received from the authority node 120 and monitors content items requested by or sent from the external systems 200, 220 and 230. In an exemplary embodiment, each of the processing nodes 110 may also store a detection process filter 112 and/or threat data 114 to facilitate the decision of whether a content item should be processed for threat detection. A processing node manager 118 may manage each content item in accordance with the security policy data 113, and the detection process filter 112 and/or threat data 114, if stored at the processing node 110, so that security policies for a plurality of external systems in data communication with the processing node 110 are implemented external to the network edges for each of the external systems 200, 220 and 230. For example, depending on the classification resulting from the monitoring, the content item may be allowed, precluded, or threat detected. In general, content items that are already classified as "clean" or not posing a threat can be allowed, while those classified as "violating" may be precluded. Those content items having an unknown status, e.g., content items that have not been processed by the system 100, may be threat detected to classify the content item according to threat classifications.

The processing node 110 may include a state manager 116A. The state manager 116A may be used to maintain the authentication and the authorization states of users that submit requests to the processing node 110. Maintenance of the states through the state manager 116A may minimize the number of authentication and authorization transactions that are necessary to process a request. The processing node 110 may also include an epoch processor 116B. The epoch processor 116B may be used to analyze authentication data that originated at the authority node 120. The epoch processor 116B may use an epoch ID to further validate the authenticity of authentication data. The processing node 110 may further include a source processor 116C. The source processor 116C may be used to verify the source of authorization and authentication data. The source processor 116C may identify improperly obtained authorization and authentication data, enhancing the security of the network. Collectively, the state manager 116A, the epoch processor 116B, and the source processor 116C operate as data inspection engines.

Because the amount of data being processed by the processing nodes 110 may be substantial, the detection processing filter 112 may be used as the first stage of an information lookup procedure. For example, the detection processing filter 112 may be used as a front end to a looking of the threat data 114. Content items may be mapped to index values of the detection processing filter 112 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence. Each content item may have an information key that is hashed. For example, the processing node manager 118 may identify the Uniform Resource Locator (URL) address of URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 may improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 thus improves performance of queries where the answer to a request for information is usually positive. Such instances may include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information. In an exemplary embodiment, the detection processing filter 112 may be a Bloom filter implemented by a single hash function. The Bloom filter may be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

§2.2 Example Authority Node Architecture

In general, the authority node 120 includes a data store that stores master security policy data 123 for each of the external systems 200, 220 and 230. An authority node manager 128 may be used to manage the master security policy data 123, e.g., receive input from users of each of the external systems defining different security policies, and may distribute the master security policy data 123 to each of the processing nodes 110. The processing nodes 110 then store a local copy of the security policy data 113. The authority node 120 may also store a master detection process filter 122. The detection processing filter 122 may include data indicating whether content items have been processed by one or more of the data inspection engines 116 in any of the processing nodes 110. The authority node manager 128 may be used to manage the master detection processing filter 122, e.g., receive updates from a processing nodes 110 when the processing node 110 has processed a content item and update the master detection processing filter 122. For example, the master detection processing filter 122 may be distributed to the processing nodes 110, which then store a local copy of the detection processing filter 112.

In an exemplary embodiment, the authority node 120 may include an epoch manager 126. The epoch manager 126 may be used to generate authentication data associated with an epoch ID. The epoch ID of the authentication data is a verifiable attribute of the authentication data that can be used to identify fraudulently created authentication data. In an exemplary embodiment, the detection processing filter 122 may be a guard table. The processing node 110 may, for example, use the information in the local detection processing filter 112 to quickly determine the presence and/or absence of information, e.g., whether a particular URL has been checked for malware; whether a particular executable has been virus scanned, etc. The authority node 120 may also store master threat data 124. The master threat data 124 may classify content items by threat classifications, e.g., a list of known viruses, a list of known malware sites, spam email domains, list of known or detected phishing sites, etc. The authority node manager 128 may be used to manage the master threat data 124, e.g., receive updates from the processing nodes 110 when one of the processing nodes 110 has processed a content item and update the master threat data 124 with any pertinent results. In some implementations, the master threat data 124 may be distributed to the processing nodes 110, which then store a local copy of the threat data 114. In another exemplary embodiment, the authority node 120 may also monitor the health of each of the processing nodes 110, e.g., the resource availability in each of the processing nodes 110, detection of link failures, etc. Based on the observed health of each of the processing nodes 110, the authority node 120 may redirect traffic among the processing nodes 110 and/or balance traffic among the processing nodes 110. Other remedial actions and processes may also be facilitated by the authority node 110.

§2.3 Example Processing Node and Authority Node Communications

The processing node 110 and the authority node 120 may be configured according to one or more push and pull processes to manage content items according to security policy data 113 and/or 123, detection process filters 112 and/or 122, and the threat data 114 and/or 124. In a threat data push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data 114, then the processing node manager 118 may cause one or more of the data inspection engines 117 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120.

The authority node manager 128, in response to receiving the threat data update, updates the master threat data 124 stored in the authority node data store according to the threat data update received from the processing node 110. In an exemplary embodiment, the authority node manager 128 may automatically transmit the updated threat data to the other processing nodes 110. Accordingly, threat data for new threats as the new threats are encountered are automatically distributed to each processing node 110. Upon receiving the new threat data from the authority node 120, each of processing node managers 118 may store the updated threat data in the locally stored threat data 114.

In a threat data pull and push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data, then the processing node manager 118 may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data store. If responsive threat data is stored in the master threat data 124, then the authority node manager 128 provide a reply that includes the responsive threat data to the processing node 110 so that the processing node manager 118 may manage the content item in accordance with the security policy data 112 and the classification of the content item. Conversely, if the authority node manager 128 determines that responsive threat data is not stored in the master threat data 124, then the authority node manager 128 may provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests related to responsive threat data for the content item from other processing nodes 110 can be readily served with responsive threat data.

In a detection process filter and threat data push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 may be implemented to ensure that a false positive has not occurred. The initial check of the detection process filter 112, however, may eliminate many null queries to the threat data 114, which, in turn, conserves system resources and increases efficiency. If the content item is classified by the threat data 114, then the processing node manager 118 may manage the content item in accordance with the security policy data 113 and the classification of the content item. Conversely, if the processing node manager 118 determines that the content item is not classified by the threat data 114, or if the processing node manager 118 initially determines through the detection process filter 112 that the content item is not classified by the threat data 114, then the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to one of the authority nodes 120.

The authority node manager 128, in turn, may update the master threat data 124 and the master detection process filter 122 stored in the authority node data store according to the threat data update received from the processing node 110. In an exemplary embodiment, the authority node manager 128 may automatically transmit the updated threat data and detection processing filter to other processing nodes 110. Accordingly, threat data and the detection processing filter for new threats as the new threats are encountered are automatically distributed to each processing node 110, and each processing node 110 may update its local copy of the detection processing filter 112 and threat data 114.

In a detection process filter and threat data pull and push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 can be implemented to ensure that a false positive has not occurred. The initial check of the detection process filter 112, however, may eliminate many null queries to the threat data 114, which, in turn, conserves system resources and increases efficiency. If the processing node manager 118 determines that the content item has not been processed, it may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data 120 store. If responsive threat data is stored in the master threat data 124, then the authority node manager 128 provides a reply that includes the responsive threat data to the processing node 110 so that the processing node manager 118 can manage the content item in accordance with the security policy data 112 and the classification of the content item, and further update the local detection processing filter 112. Conversely, if the authority node manager 128 determines that responsive threat data is not stored in the master threat data 124, then the authority node manager 128 may provide a reply that does not include the responsive threat data to the processing node 110. In response, the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 may then update the master threat data 124. Thereafter, any future requests for related to responsive threat data for the content item from other processing nodes 110 can be readily served with responsive threat data.

The various push and pull data exchange processes provided above are exemplary processes for which the threat data and/or detection process filters may be updated in the system 100 of FIGS. 1 and 2. Other update processes, however, are contemplated with the present invention. The data inspection engines 116, processing node manager 118, authority node manager 128, user interface manager 132, logging node manager 148, and authority agent 180 may be realized by instructions that upon execution cause one or more processing devices to carry out the processes and functions described above. Such instructions can, for example, include interpreted instructions, such as script instructions, e.g., JavaScript or ECMAScript instructions, or executable code, or other instructions stored in a non-transitory computer readable medium. Other processing architectures can also be used, e.g., a combination of specially designed hardware and software, for example.

§3.0 Exemplary Server Architecture

Referring to FIG. 3, in an exemplary embodiment, a block diagram illustrates a server 300 which may be used in the system 100, in other systems, or standalone. Any of the processing nodes 110, the authority nodes 120, and the logging nodes 140 may be formed through one or more servers 300. Further, the computer device 220, the mobile device 230, the servers 208, 216, etc. may include the server 300 or a similar structure. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, the WAN 101, the enterprise 200, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

§4.0 Exemplary Mobile Device Architecture

Figure 4:
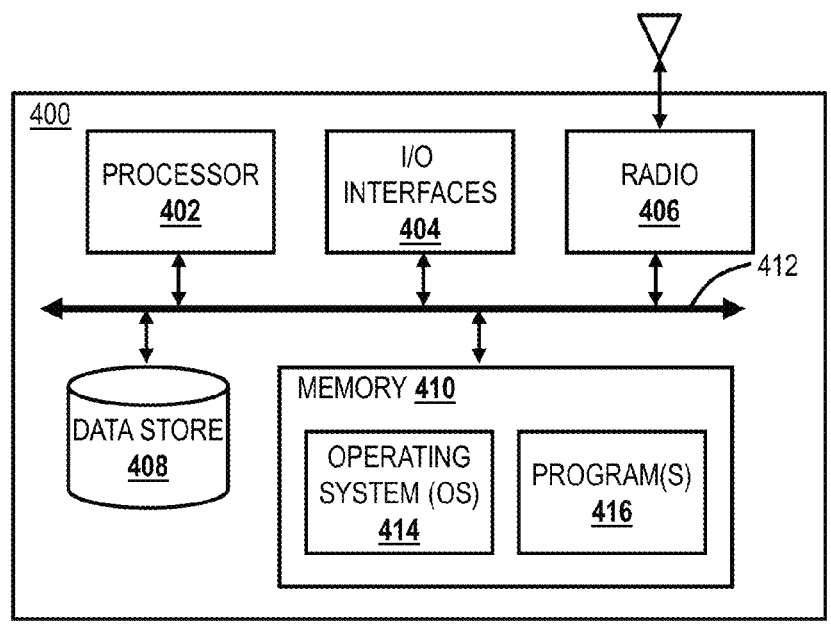
FIG. 4 is a block diagram of a mobile device which may be used in the system of FIG. 1 or with any other cloud-based system.

Referring to FIG. 4, in an exemplary embodiment, a block diagram illustrates a mobile device 400, which may be used in the system 100 or the like. The mobile device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 4 depicts the mobile device 410 in an oversimplified manner, and a practical embodiment may include additional components and suitably configured processing logic to support known or conventional operating features that are not described in detail herein. The components (402, 404, 406, 408, and 402) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the mobile device 410, a semiconductor-based microprocessor (in the form of a microchip or chip set), or generally any device for executing software instructions. When the mobile device 410 is in operation, the processor 402 is configured to execute software stored within the memory 410, to communicate data to and from the memory 410, and to generally control operations of the mobile device 410 pursuant to the software instructions. In an exemplary embodiment, the processor 402 may include a mobile optimized processor such as optimized for power consumption and mobile applications. The I/O interfaces 404 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the mobile device 410. Additionally, the I/O interfaces 404 may further include an imaging device, i.e. camera, video camera, etc.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 4, the software in the memory 410 includes a suitable operating system (O/S) 414 and programs 416. The operating system 414 essentially controls the execution of other computer programs, and provides scheduling, input-output control, file and data management, memory management, and communication control and related services. The programs 416 may include various applications, add-ons, etc. configured to provide end user functionality with the mobile device 400. For example, exemplary programs 416 may include, but not limited to, a web browser, social networking applications, streaming media applications, games, mapping and location applications, electronic mail applications, financial applications, and the like. In a typical example, the end user typically uses one or more of the programs 416 along with a network such as the system 100.

§5.0 Exemplary General Cloud System

Figure 5A:
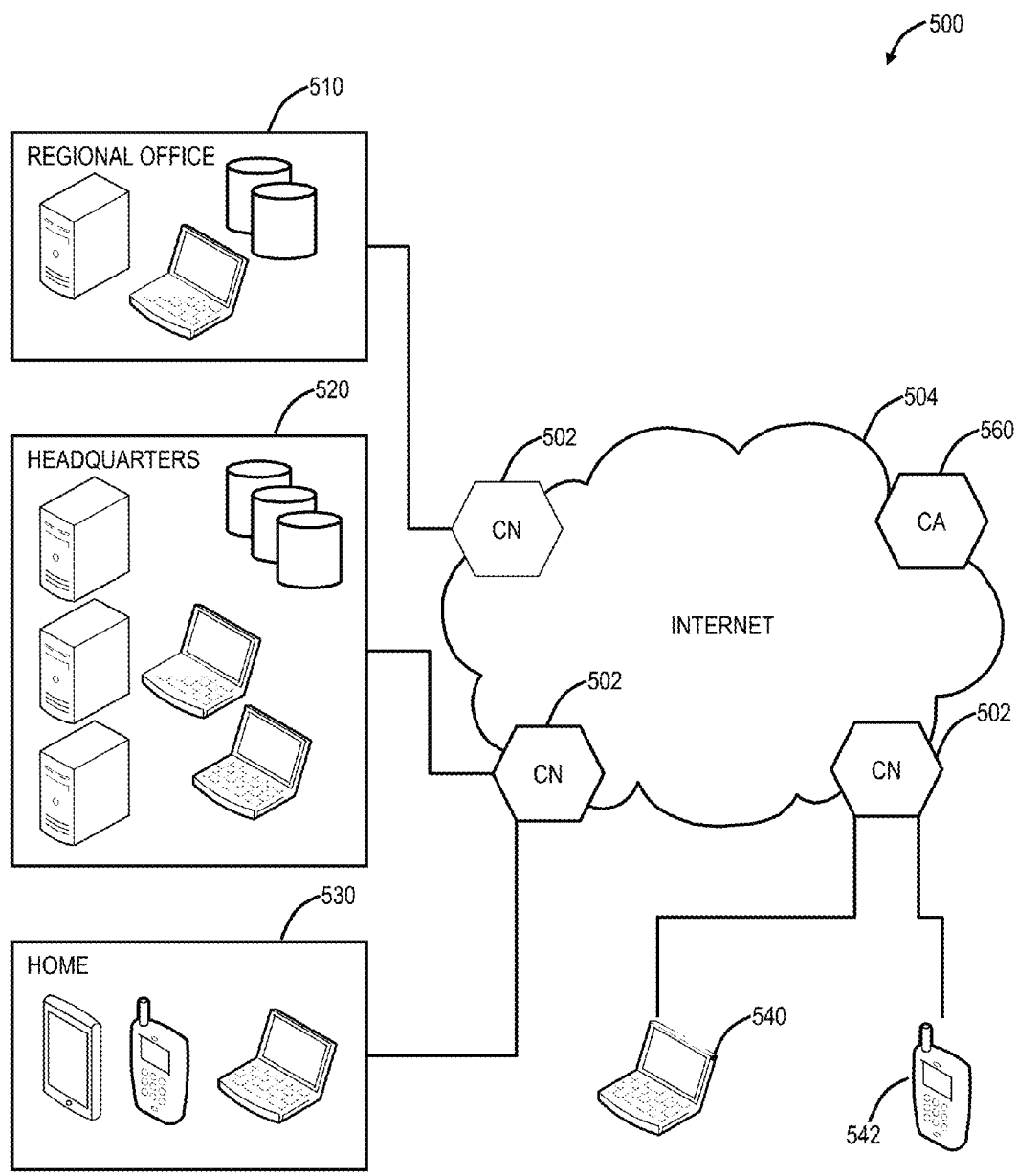
FIG. 5A is a network diagram of a cloud system and FIG. 5B is a network diagram of a network with a distributed security cloud providing DNS augmented security.

Referring to FIG. 5A, in an exemplary embodiment, a cloud system 500 is illustrated for implementing the systems and methods described herein. The cloud system 500 includes one or more cloud nodes (CN) 502 communicatively coupled to the Internet 504. The cloud nodes 502 may include the processing nodes 110, the server 300, or the like. That is, the cloud system 500 may include the distributed security system 100 or another implementation of a cloud based system. In the cloud system 500, traffic from various locations (and various devices located therein) such as a regional office 510, headquarters 520, various employee's homes 530, mobile laptop 540, and mobile device 542 is redirected to the cloud through the cloud nodes 502. That is, each of the locations 510, 520, 530, 540, 542 is communicatively coupled to the Internet 504 through the cloud nodes 502. The cloud system 500 may be configured to perform various functions such as spam filtering, uniform resource locator (URL) filtering, antivirus protection, bandwidth control, data loss prevention, zero day vulnerability protection, web 2.0 features, and the like. In an exemplary embodiment, the cloud system 500 and the distributed security system 100 may be viewed as Security-as-a-Service through the cloud.

In an exemplary embodiment, the cloud system 500 can be configured to provide mobile device security and policy systems and methods. The mobile device 542 may be the mobile device 400, and may include common devices such as smartphones, tablets, netbooks, personal digital assistants, MP3 players, cell phones, e-book readers, and the like. The cloud system 500 is configured to provide security and policy enforcement for devices including the mobile devices 542 in the cloud. Advantageously, the cloud system 500 avoids platform specific security apps on the mobile devices 542, forwards web traffic through the cloud system 500, enables network administrators to define policies in the cloud, and enforces/cleans traffic in the cloud prior to delivery to the mobile devices 542. Further, through the cloud system 500, network administrators may define user centric policies tied to users, not devices, with the policies being applied regardless of the device used by the user. The cloud system 500 provides 24×7 security with no need for updates as the cloud system 500 is always up-to-date with current threats and without requiring device signature updates. Also, the cloud system 500 enables multiple enforcement points, centralized provisioning and logging, automatic traffic routing to a nearest cloud node 502, geographical distribution of the cloud nodes 502, policy shadowing of users which is dynamically available at the cloud nodes, etc.

§5.1 DNS Augmented Security

In various exemplary embodiments, the cloud system 500 and/or the distributed security system 100 can be used to perform DNS surrogation. Specifically, DNS surrogation can be a framework for distributed or cloud-based security/monitoring as is described herein. Endpoint security is no longer effective as deployments move to the cloud with users accessing content from a plurality of devices in an anytime, anywhere connected manner. As such, cloud-based security is the most effective means to ensure network protection where different devices are used to access network resources. Traffic inspection in the distributed security system 100 and the cloud-based system 500 is performed in an in-line manner, i.e. the processing nodes 110 and the cloud nodes 500 are in the data path of connecting users. Another approach can include a passive approach to the data path. DNS is one of the most fundamental IP protocols. With DNS surrogation as a technique, it is proposed to use DNS for dynamic routing of traffic, per user authentication and policy enforcement, and the like.

In conjunction with the cloud system 500 and/or the distributed security system 100, various techniques can be used for monitoring which are described on a sliding scale between always inline to never inline. First, in an always inline manner, all user traffic is between inline proxies such as the processing nodes 110 or the cloud nodes 502 without exception. Here, DNS can be used as a forwarding mechanism to the inline proxies. Second, in a somewhat always inline manner, all user traffic except for certain business partners or third parties is between inline proxies such as the processing nodes 110 or the cloud nodes 502. Third, in an inline manner for most traffic, high bandwidth applications can be configured to bypass the inline proxies such as the processing nodes 110 or the cloud nodes 502. Exemplary high bandwidth applications can include content streaming such as video (e.g., Netflix, Hulu, YouTube, etc.) or audio (e.g., Pandora, etc.). Fourth, in a mixed manner, inline monitoring can be used for "interesting" traffic as determined by security policy with other traffic being direct. Fifth, in an almost never inline manner, simple domain-level URL filtering can be used to determine what is monitored inline. Finally, sixth, in a never inline manner, DNS augmented security can be used.

Figure 5B:
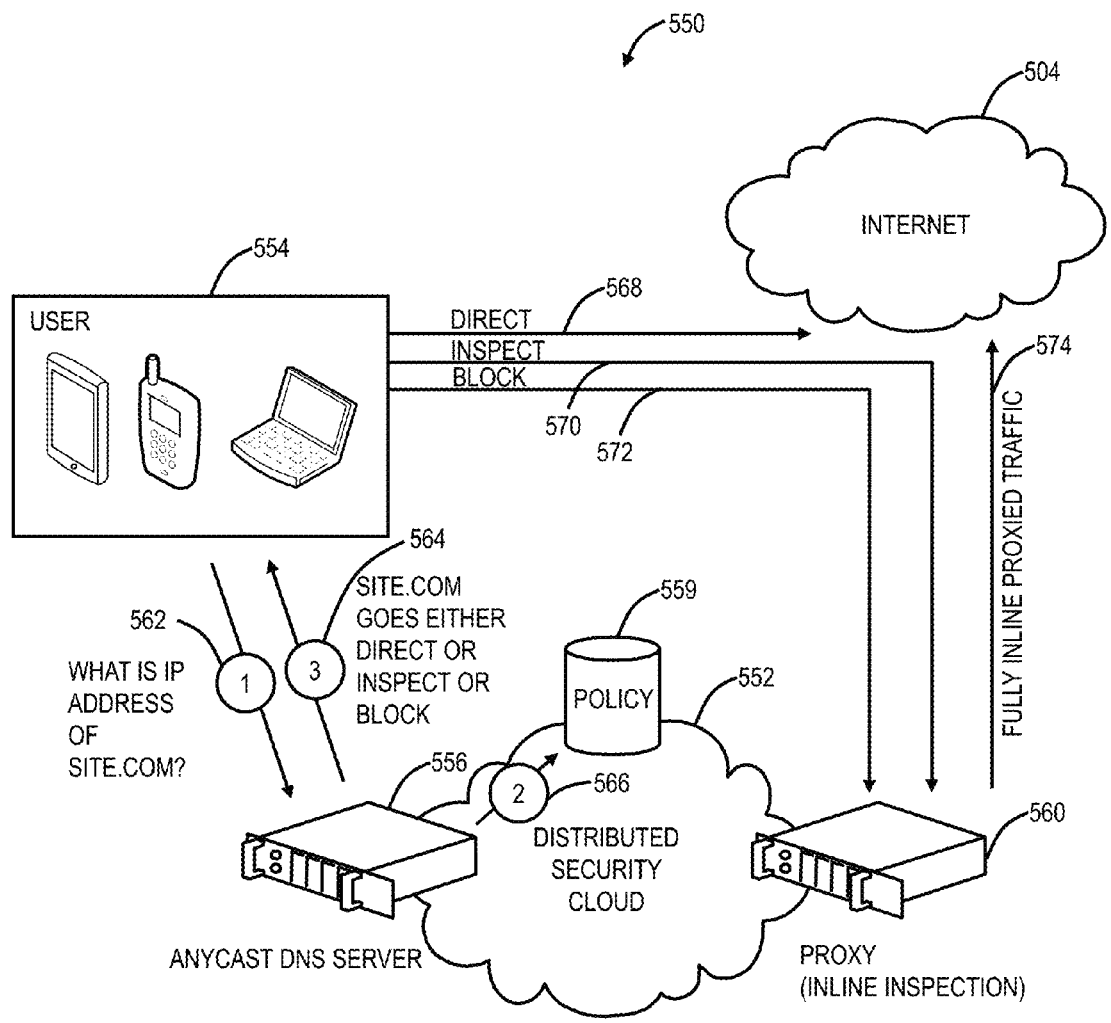

Referring to FIG. 5B, in an exemplary embodiment, a network diagram illustrates a network 550 with a distributed security cloud 552 providing DNS augmented security. The network 550 includes a user device 554 connecting to the distributed security cloud 552 via an anycast DNS server 556. The anycast DNS server 556 can be a server such as the server 300 of FIG. 3. Also, the anycast DNS server 556 can be the processing node 110, the cloud node 502, etc. The distributed security cloud 552 includes the anycast DNS server 556, policy data 558, and an inline proxy 560. The inline proxy 560 can include the processing node 110, the cloud node 502, etc. In operation, the user device 554 is configured with a DNS entry of the anycast DNS server 556, and the anycast DNS server 556 can perform DNS surrogation as is described herein. The distributed security cloud 552 utilizes the anycast DNS server 556, the policy data 558, and the inline proxy 560 to perform the DNS augmented security.

The network 550 illustrates the DNS augmented security where DNS information is used as follows. First, at a step 562, the user device 554 requests a DNS lookup of a site, e.g. "what is the IP address of site.com?" from the anycast DNS server 556. The anycast DNS server 556 accesses the policy data 558 to determine the policy associated with the site at step 564. The anycast DNS server 556 returns the IP address of the site based on the appropriate policy at step 566. The policy data 558 determines if the site either goes direct (step 568) to the Internet, is inspected by the inline proxy (step 570), or is blocked per policy (step 572). Here, the anycast DNS server 556 returns the IP address with additional information if the site is inspected or blocked. For example, if the anycast DNS server 556 determines the access is direct, the anycast DNS server 556 simply returns the IP address of the site. If the anycast DNS server 556 determines the site is blocked or inspected, the anycast DNS server 556 returns the IP address to the inline proxy 560 with additional information. The inline proxy 560 can block the site or provide fully inline proxied traffic to the site (step 574) after performing monitoring for security.

The DNS augmented security advantageously is protocol and application agnostic providing visibility and control across virtually all Internet-bound traffic. For example, DNS-based protocols include Internet Relay Chat (IRC), Session Initiation Protocol (SIP), Hypertext Transfer Protocol (HTTP), HTTP Secure (HTTPS), Post Office Protocol v3 (POP3), Internet Message Access Protocol (IMAP), etc. Further, emerging threats are utilizing DNS today especially Botnets and advanced persistent threats (APTs). For example, Fast flux is a DNS technique used to hide phishing and malware delivery sites behind an ever-changing network of compromised hosts acting as proxies. The DNS augmented security provides deployment flexibility when full inline monitoring is not feasible. For example, this can be utilized in highly distributed with high bandwidth environments, in locations with challenging Internet Access, etc. The DNS augmented security can provide URL filtering, white/black list enforcement, etc. for enhanced security without content filtering. In this manner, the network 550 can be used with the distributed security system 100 and the cloud system 500 to provide cloud-based security without requiring full inline connectivity.

§6.0 Web Transaction Archiving System

Figure 6:
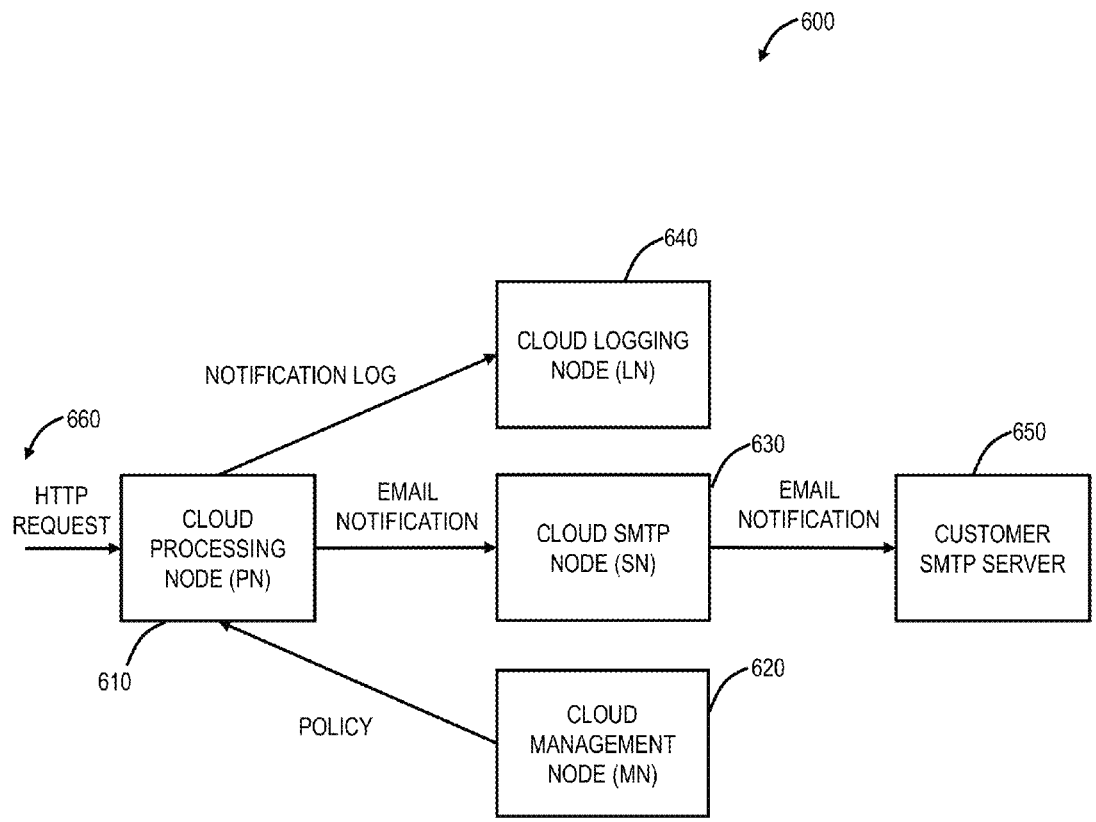
FIG. 6 is a network diagram of a network with a distributed security cloud providing DNS augmented security.

Referring to FIG. 6, in an exemplary embodiment, a functional block diagram illustrates a web transaction archiving system 600. The archiving system 600 can be based on the systems 100, 500, or another type of system. That is, the archiving system 600 can operate on any cloud system handling web or any other data transactions. The archiving system 600 includes a cloud processing node 610, a cloud management node 620, a cloud Simple Mail Transfer Protocol (SMTP) node 630, a cloud logging node 640, and a customer SMTP server 650. In an exemplary embodiment, the cloud processing node 610 can be the processing node 110 or the cloud node 502, the cloud management node 620 can be the authority node 120 or part of the cloud node 502, and the logging node 640 can be the logging node 140 or part of the cloud node 502. The cloud SMTP node 630 can be part of any of the logging node 140, the processing node 110, the authority node 120, the cloud node 502, or a standalone device. Collectively, the nodes 610, 620, 630, 640 are part of a cloud system, i.e. the system 100, 500, etc. The customer SMTP server 650 is a mail server located within an organization's administrative domain. For example, in FIG. 2, the customer SMTP server 650 could be within the enterprise 200 behind the firewalls 202, 203.

In operation, the cloud processing node 610 interfaces to end users 660, such as receiving HTTP requests or any other data (e.g., collectively referred to as web transactions or app transactions). The cloud processing node 610 is configured to perform the various functions described herein for the processing node 110 and the cloud node 502. That is, the cloud processing node 610 can perform data analysis on any requests to/from the end users. In context of this data analysis, the archiving systems and methods seek to avoid storing any private data associated with the organization within the confines of the cloud. The cloud processing node 610 performs the data analysis based on policy information provided by the cloud management node 620 (i.e., previously provided, provided on-demand, etc.). Part of this policy information can include archiving rule for specific security policies. Exemplary archiving rules can include, without limitation, not storing data related to a security incident event (e.g., a data leakage event, etc.), not storing data related to accessing certain Web sites, not storing data related to specific users, etc. Through the cloud management node 620, the archiving rules can be modified as needed by an IT representative of an organization. The cloud logging node 640 is used for storing notification logs related to the data analysis. In an exemplary embodiment, the cloud logging node 640 can store a log entry for any event detected at the cloud processing node 610. However, the data in the log entry can be based on the archiving rules. For example, a security incident event could just denote the specifics of the event without storing the associated data at the cloud logging node 640.

The cloud SMTP node 630 is configured to handle archiving of data when there is an archiving rule in place. The cloud SMTP node 630 is configured to receive a notification when there is an event and an archiving rule in place. For example, assuming the cloud SMTP node 630 is separated from the cloud processing node 610, the cloud SMTP node 630 can receive an email notification from the cloud processing node 610. Alternatively, the cloud SMTP node 630 can be part of the cloud processing node 610, i.e. part of the processing node 110, the cloud node 502, etc., and in this exemplary embodiment, the cloud processing node 610 can simply internally notify the cloud SMTP node 630. The cloud SMTP node 630 is configured to compose an email to the customer SMTP server 650 based on the archiving rule and to securely transmit the email to the customer SMTP server 650. Subsequent to the email transmission, the cloud, i.e. the nodes 610, 620, 630, 640, no longer has the data related to the event. The data is securely within the organization's domain in the customer SMTP server 650. The customer SMTP server 650 can include functionality to automatically archive the data in the email in a customer managed log. Thus, the archiving systems and methods provide dual benefits i.e. limiting data storage in the cloud while honoring data privacy requirements of the customer.

§7.0 Web Transaction Archiving Methods

Figure 7:
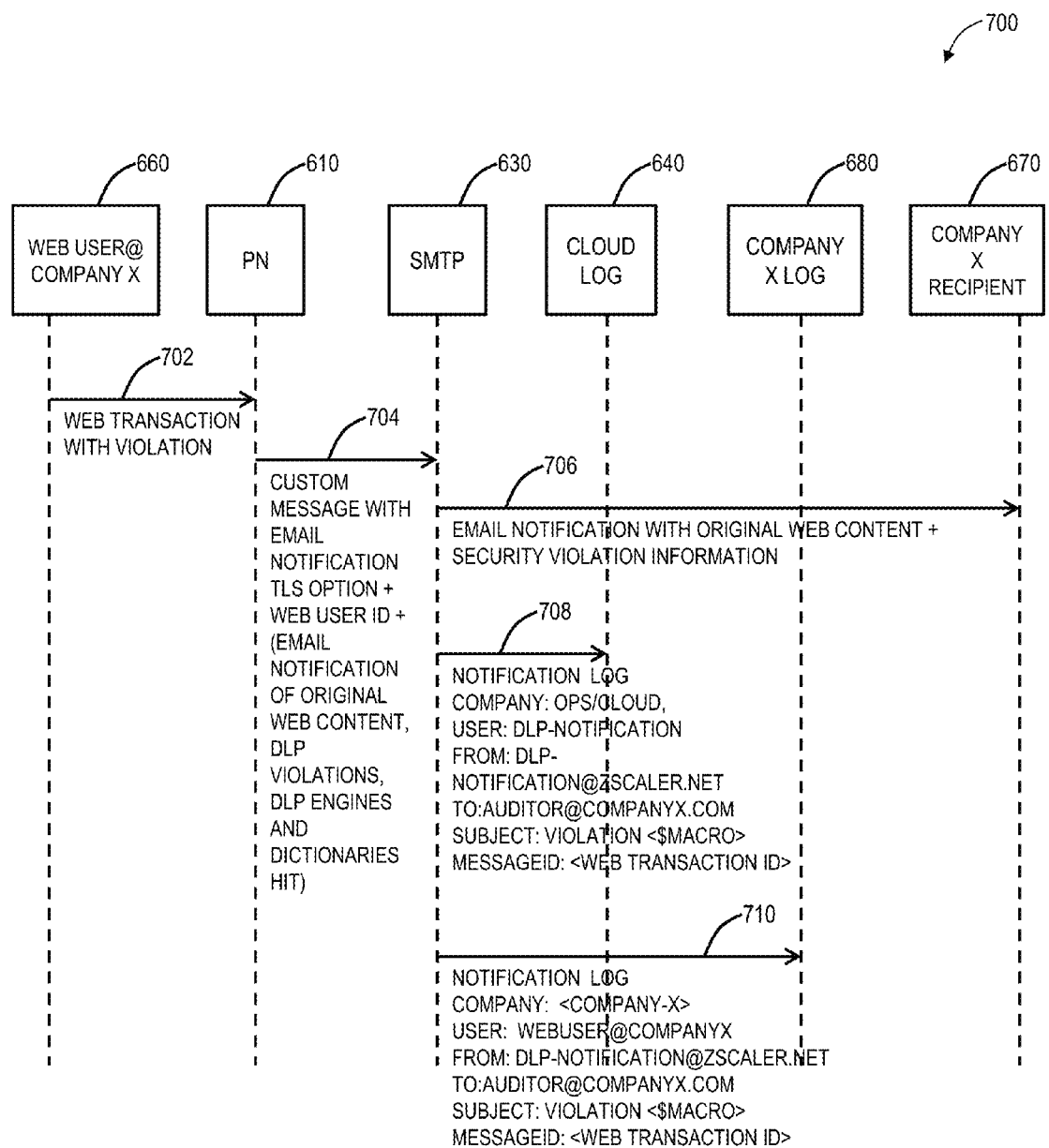
FIG. 7 is a flow diagram of an archiving method.

Referring to FIG. 7, in an exemplary embodiment, a flow diagram illustrates an archiving method 700. The archiving method 700 can be implemented with the web transaction archiving system 600, the cloud system 500, the distributed security system 100, etc. The archiving method 700 is illustrated relative to functions associated with the nodes 610, 630, 640, 650, the end user 660, and a recipient 670 at company X with company X being the organization associated with the end user 660 (i.e., the data belongs to company X). To start, a web transaction (or any data transaction) with a violation is presented to the archiving method 700. Specifically, the archiving method 700 processes outputs from a security processing engine, e.g. such as described herein in the functionality of the processing node 110 and the cloud node 502. The archiving method 700 is presented with content extract which triggers the security event or violation, original content, security policy, etc. The archiving method 700 can be implemented based on a setting or policy of archiving content associated with violations. The cloud processing node 610 detects a web transaction with a violation (step 702). Note, this violation is one in which archiving rules require the data to be stored with company X's domain and not in the cloud. The cloud processing node 610 provides a message to customer SMTP server 650 (step 704).

In an exemplary embodiment, the message is an email notification with Transport Layer Security (TLS) and data including a Web User ID of the user associated with the violation and various data about the violation. Exemplary data about the violation can include the original Web content triggering the violation, Data Leakage Prevention (DLP) violation related data, DLP engines and dictionaries hit, etc. Specifically, the email notification can include meta information of the web transaction, such as, URL; user of the web transaction and, in case USER is not present, a location; type of web transaction such as Social Networking, Web mail, Web post; names of security engine hit; and the like. The email notification can also include the extracted patterns which contribute towards the triggering of a security policy, i.e. the rationale for flagging the transaction as a violation. Thus, original content from Web transaction is attached to the email, and if the content was in file being uploaded then that file is attached to the email. In an exemplary embodiment, the processing node 610 provides the message to customer SMTP server 650 as described above. In another exemplary embodiment, the processing node 610 provides the message to the cloud SMTP server 630 which in turn can provide the message to the customer SMTP server 650. Alternatively, the cloud SMTP server 630 can be integrated with the processing node 610.

The customer SMTP server 650 (or the cloud SMTP server 630) can be configured to perform numerous steps. First, the SMTP server 650 can send a notification (e.g., email, text message, URL, etc.) with the original web content and security violation to a recipient 670 at company X (step 706). For example, the recipient 670 could be someone in IT or some other person responsible for data security and control. The purpose of this notification can be to alert the company X of the violation for any reactive measures to be taken. Next, cloud SMTP server 630 sends a notification to the cloud logging node 640 (step 708). This notification can also be an email message with relevant data that is stored in the cloud, i.e. the relevant data does not include the data stored with company X per the archiving rule. The relevant data is data used by the cloud system for proactive security, i.e. data related to the violation that can be used for subsequent detections of violations. This data may be anonymized as well as excluding the data stored with company X per the archiving rule. The SMTP server 650 can also send a notification to a company X log 680 (step 710). The company X log 680 can reside on the cloud SMTP server 630 or a separate device, and the company X log 680 includes a database of violations. Subsequently, company X, through this database, company X IT can search for violations, view and prepare reports of violations, etc. providing an integrated view for proactive security measures.

Figure 8:
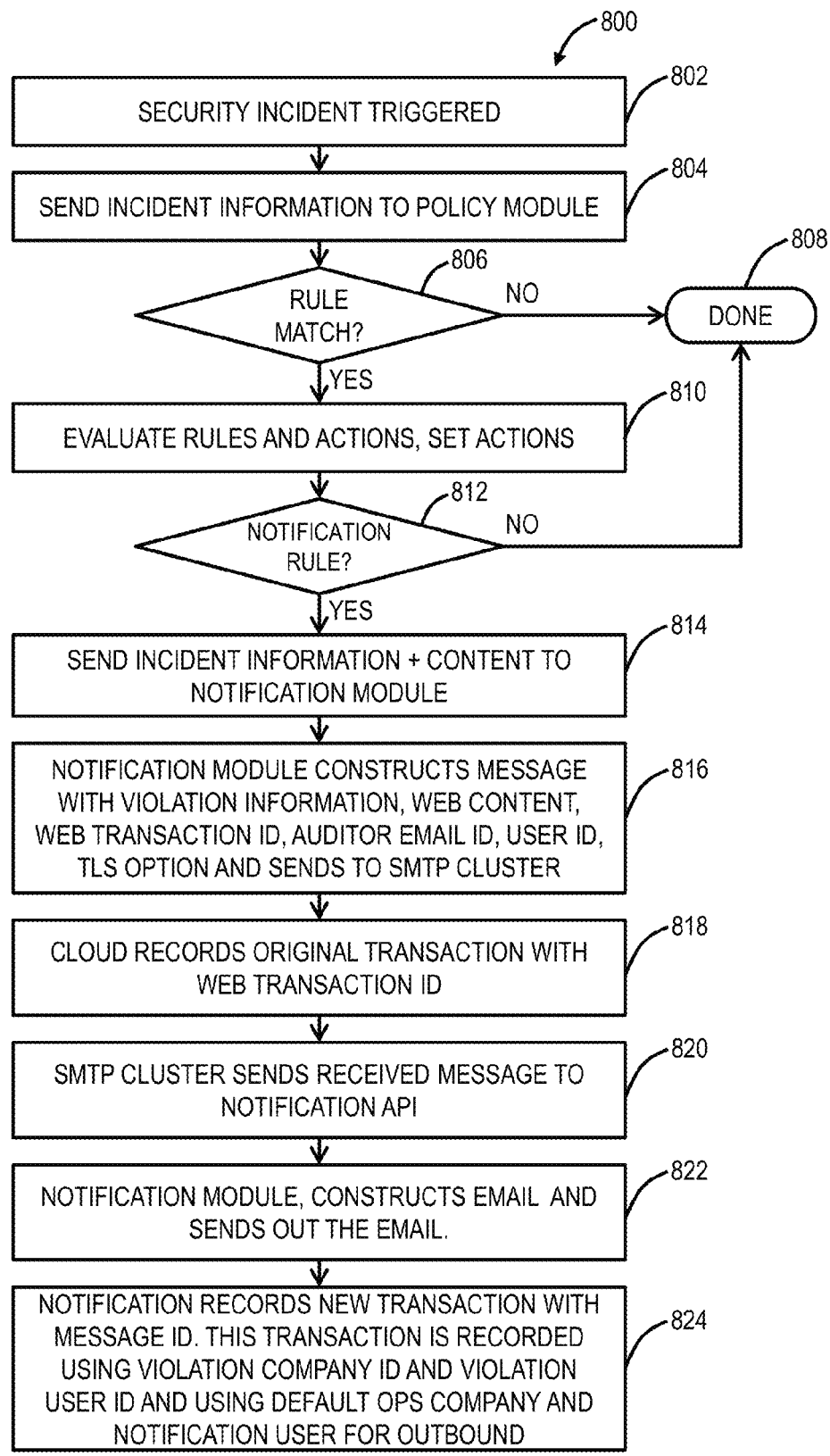
FIG. 8 is a flowchart of an archiving method.

Referring to FIG. 8, in an exemplary embodiment, a flowchart illustrates an archiving method 800. The archiving method 800 can be implemented with the web transaction archiving system 600, the cloud system 500, the distributed security system 100, etc. In general, the method 800 can be implemented by a computer, such as the server 300 described herein, through instructions on a computer-readable medium that are executed by the processor 302 to cause the server 300 perform the method 800. First, the method 800 has a security incident triggered (step 802). Exemplary security incidents can include malware, spyware, viruses, Trojans, botnets, email spam, policy violations, data leakage, etc. The incident information is sent to a policy module (step 804). Here, an analysis is performed on the incident including checking if there is an archiving rule match (step 806). Archiving rules can be defined per organization per violation type, and can generally define what information is stored in the cloud and what information is securely stored with the organization's domain, i.e. not within the cloud. If there is no archiving rule in place (step 806), the method 800 is complete (step 808). If there is an archiving rule in place (step 806), the method 800 evaluates associated rules and actions based on the incident, and sets actions based thereon (step 810).

The method 800 checks if there is a notification rule (step 812). For example, the method 800 can include two aspects, 1) is there a rule preventing archiving in the cloud, and 2) is there a rule requiring archiving within an organization's domain. These two aspects can be mutually applied. For example, if there is no notification rule (step 812), the method 800 can end (step 808) with the cloud system simply not storing the data related to the incident. If there is a notification rule (step 812), the method 800 can send the incident information and content to a notification module (step 814). The notification module constructs a message with violation information, web content, web transaction ID, auditor contact info, user, info, TLS, etc. and sends the message to an SMTP cluster (step 816). The SMTP cluster can be the cloud SMTP node 630, and generally includes equipment within the cloud to create notifications to the organization. The cloud can record the original transaction with the web transaction ID (step 818). Here, the cloud, e.g. the processing node 610, the cloud SMTP node 630, etc., can log and store information related information while adhering to the rules (e.g., storing incident information without underlying content). The SMTP cluster can send the received message to a notification Application Programming Interface (API) (step 820). The notification module constructs an email based on the received message and sends out the email (step 822). The notification module, in the cloud, records a new transaction based on a message ID (step 824). This transaction, in the cloud, can be recorded using a violation company ID and violation user ID, etc. Further, the transaction can be send out for notification to the company, users, etc. The policy module and the notification module can include physical devices, hardware, software, firmware, etc. to perform the various functions in the method 800.

Figure 9:
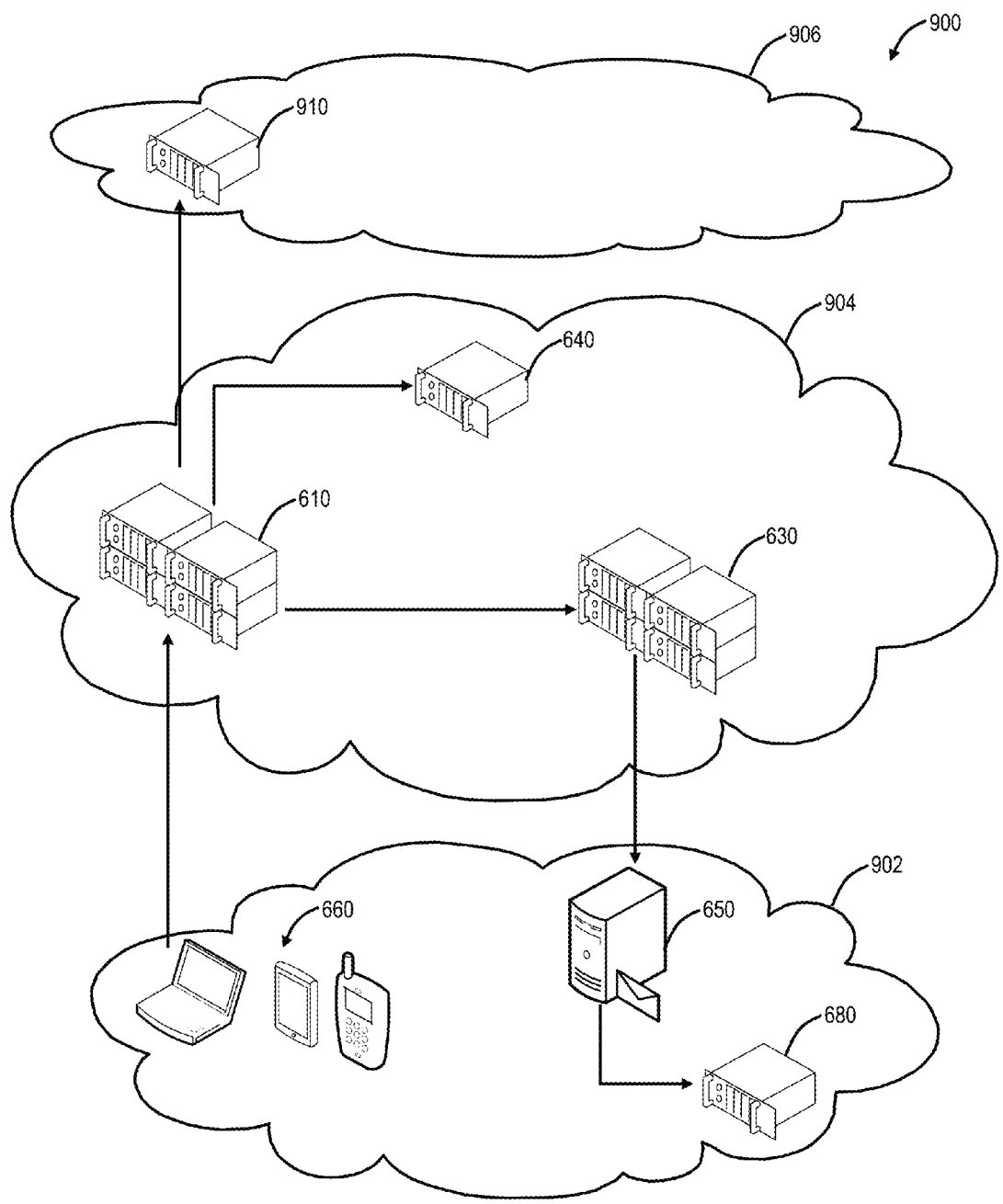
FIG. 9 is a network diagram of a network depicting an exemplary operation of the archiving methods of FIGS. 7 and 8.

Referring to FIG. 9, in an exemplary embodiment, a network diagram illustrates a network 900 depicting an exemplary operation of the archiving methods 700, 800. The network 900 includes an organization's domain 902, a cloud system 904, and an external network 906 (e.g., the Internet). As described herein, the cloud system 904 is an intermediate layer between the domain 902 and the network 906, and the cloud system 904 is configured to implement the archiving systems and methods described herein in conjunction with the domain 902. The domain 902 includes users 660, the SMTP server 650, and, optionally, the company X log 680. The cloud system 604 includes the cloud processing node 610, the cloud SMTP node 630, and the cloud logging node 640. The external network 906 can include a site 910. In operation, a user 660 can access the site 910 through the cloud system 904, specifically through the cloud processing node 610. If there is no violation, the cloud processing node 610 simply acts as a proxy between the site 910 and the user 660. If there is a violation and an associated archiving rule, the cloud processing node 610 is configured to implement the methods 700, 800 with the devices 630, 640, 650, 680 to ensure no private data (per the archiving rule) belonging the organization is stored in the cloud system 904, but rather stored within the domain 902 through the devices 650, 680. In another exemplary embodiment, private data belonging to the organization could be stored in the cloud system 904, but with an approach that ensures this private data is only reviewable or accessible by the organization. For example, the devices 610, 630, 640 could include encrypted storage for storing violation information. This encrypted storage could a use key per organization and encrypt the data using that key before storing the data. Thus while private data is stored in the cloud system 904, it is only accessible with the organization's private key.

In an exemplary embodiment, a cloud based security method includes monitoring data traffic between a user and an external network, wherein monitoring is performed by a processing node including a first server in a cloud based system; detecting a security incident; if an archiving rule exists based on the security incident, providing a notification to a second server within an organization's domain, wherein the user is part of the organization, and wherein the notification includes private data associated with the security incident based on the archiving rule; and storing non-private data in the cloud based system based on the archiving rule. In another exemplary embodiment, a cloud based security system includes a plurality of servers forming a cloud system; a processing module executed on the plurality of servers to detect security incidents in data communications between users and an external network; a policy module executed on the plurality of servers to determine archiving rules associated with detected security incidents; and a notification module executed on the plurality of servers to provide notification of private data associated with the detected security incidents based on the archiving rules for storage within an associated organization's domain. In yet another exemplary embodiment, a processing node in a cloud based system includes a network interface communicatively coupled to a user and an external network; a processor; and memory storing computer executable instructions, and in response to execution by the processor, the computer executable instructions cause the processing node to perform steps of: monitoring data traffic between the user and the external network; detecting a security incident; if an archiving rule exists based on the security incident, providing a notification to a server within an organization's domain, wherein the user is part of the organization, and wherein the notification includes private data associated with the security incident based on the archiving rule; and storing non-private data based on the archiving rule.

§8.0 Out of Band Notification System and Method

Figure 10:
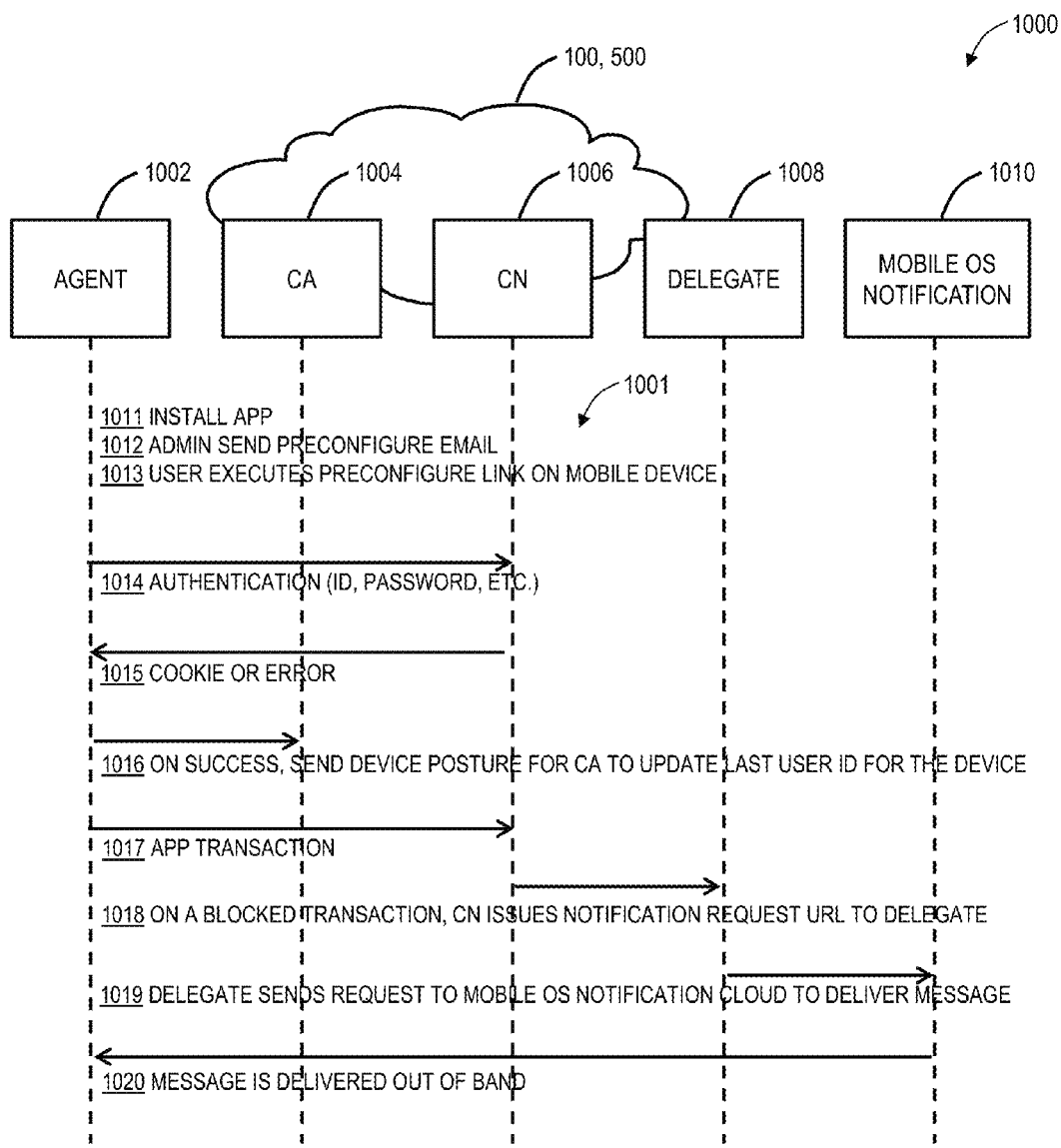
FIG. 10 is a flow diagram of an out of band notification system and method.

Referring to FIG. 10, in an exemplary embodiment, a flow diagram illustrates an out of band notification system 1000 and method 1001. The notification system 1000 includes an agent 1002, a central authority (CA) 1004, a cloud node (CN) 1006, a delegate 1008, and a mobile operating system (OS) notification cloud 1010. Collectively, the devices 1004, 1006, 1008 can be part of the distributed security system 100, the cloud system 500, the distributed security cloud 552, the cloud system 904, etc. The agent 1002 is a software program or app that is installed and operated on the mobile device 400. The agent 1002 can have various functionality such as authentication with the systems 100, 500, end user notification (EUN), and the like. Additionally, the agent 1002 can be distributed or installed through mobile OS-specific mechanisms such as Google Play (Android Marketplace), Apple App Store, Windows Marketplace, etc. The CA 1004 is a central authority (CA) server which can be used by the systems 100, 500 to track users. The CN 1006 can be the processing node 110 in the system 100 or the cloud node 502 in the system 500.

The method 1001 includes installing the agent 1002, such as an app on the mobile device 400 (step 1011). This can be done via the mobile OS-specific mechanisms or the like. An administrator sends a preconfigured email to the mobile device 400 (step 1012) and the user executes a preconfigured link or the like in the email on the mobile device 400 (step 1013). These steps configure the agent 1002 with the specific user and associated policy in the system 100, 500. Once configured and operating, the user can perform authentication such as with the agent 1002 through the cloud node 1006 (step 1014). The authentication can be anything known in the art, e.g. User ID and password, etc. The cloud node 1006 responds with a cookie (if successful) or error (if not successful) (step 1015). If the authentication is successful, a device posture is sent to the CA 1004 to update the last User ID for the mobile device 400 (step 1016). This is to create a User ID to IP binding as is described herein such that the system 100, 500 can know who is using the mobile device 400.

The method 1001 can include initiating a mobile app transaction (step 1017). If the mobile app transaction complies with relevant policy, does not contain malware, etc., the method 1001 would end here and the mobile app transaction would be successful. If the mobile app transaction is not successful, e.g., blocked, cautioned, etc., the CN 1006 can send a notification request URL to the delegate 1008 (step 1018). The delegate 1008 sends the request to the mobile OS notification cloud 1010 (step 1019), and the message can be delivered to the mobile device out of band (step 1020).

In the context of mobile security—through the systems 100, 500 and with the mobile device 400 operating the agent 1002, there are various deployment and use cases. For example, there are three exemplary deployments where mobile security can be enabled, namely:
1. Surrogate IP within enterprise (GRE without Network Address Translation (NAT)) (Bring your own device)
2. Global Proxy (Company Owned Device)
3. Mobile VPN §8.1 Surrogate IP within Enterprise (GRE without Nat)

With surrogate IP, the user on the mobile device 400 has to login once through a browser. With this verified credential, a gateway (e.g., the CA 1004) creates a mapping of the user to the IP. Note, the CA 1004 can be the processing node 110 or the authority node 120. App traffic that does not have ability to perform cloud authentication, now can be authenticated using the newly built User to IP mapping. The cloud (the systems 100, 500) can now enforce policy on App traffic as well. In this use case, there is a need for a clean login and logout feature that helps setting up User to IP binding. Once the User to IP binding is established in the CA 1004, the system 100 can enforce policy based thereon.

Again, when App traffic is blocked by the cloud such as based on configured Admin policy, the block message sent in response to the blocked request is not rendered by the apps. This is not user friendly and there is a need to send some notification to user on the mobile device 400 regarding blocked transaction. The agent 1002 solves these issued by authentication the CN 1006 creating the User to IP mapping. As a part of the EUN feature, the agent 1002 will register with Apple, Google and Windows Push notification services, i.e. the mobile OS notification cloud 1010.

After successful authentication app will obtain user cookie and will register with the CA 1004—the respective tokens and related device information along with user's ID. At this point, the cloud has mapping of user to device token. Now when EUN has to be sent to a specific user, the systems 100, 500 cloud can look up the user<->device mapping and send appropriate notifications using the mobile OS notification cloud 1010, e.g. the Apple or Google push notification infrastructure.

§8.2 Global Proxy

With the Global proxy, each request from a mobile device will carry 407 credentials for user identification. The EUN functionality is needed as explained in previous section of surrogate IP. In this case, the function of authentication will be limited to getting the user cookie and registering with the CA 1004—the device mappings to user. These mappings will be used to send notification as explained in previous section.

§8.3 Mobile VPN

With Mobile VPN, user credentials are embedded in an IPSec VPN tunnel. As with other two deployments, the EUN functionality is needed. In this case, the function of authentication is limited to getting the user cookie and registering the device mappings to user with the CA 1004. These mappings will be used to send EUN notification as descripted above.

§8.4 Delegate

The delegate 1008 is a group of application servers located outside of customer cloud that can handle two major roles. One is to maintain CCM (customer—cloud mapping) and the other is to handle the notification to servers provided by mobile OS platform such as Apple Push Notification Service (APNS), Google Cloud Messaging (GCM) for Android, and Windows Push Notification Service (WPNS) for the mobile OS notification cloud 1010. The CCM is persisted as data within delegate 1008 domain and will be initially populated by the delegate 1008. More importantly, the delegate 1008 will implement the following three HTTP commands as main application programming interfaces (API), namely 1) CCM lookup API, 2) Update CCM entry update API, 3) Request Notification API.

§8.5 Pre-configuration of the Agent

An App specific scheme can be used to pre configure primarily. A customer admin can generate a welcome email to their user and the user will execute the link in the mobile devices. The URL is designed to launch the secure agent 1002 app and will fill the passed information accordingly. The preconfigure URL can include the following information: user name and cloud info.

§8.6 AUL (Authorized User List)

The secure agent 1002 can be designed to work with the latest multi-user enabled mobile devices such as Nexus 10 or Surface. To do this, the secure agent 1002 maintains an "authorized user list" called AUL as encrypted data under the app folder with the same lifetime of app. This means if app is uninstalled, the user needs to be authorized again.

§8.7 Cloud Authentication

Authentication takes places in two steps internally although it still looks as one from the end user's point of view. The first step is authorization through the gateway of cloud to acquire cookie and IP surrogate information just like a secure browser. For example, through the systems 100, 500. The second step is to send cookie, device ID for each mobile OS notification such as device token for APNS, GCM, WPNS, AUL and more collected device posture information and scanned app list to the CA 1004 for update purpose. Whoever logs in, the secure agent 1002 always sends the whole AUL to the CA 1004 to ensure AUL is up to date in server side too. So the CA 1004 must differentiate its own data with client data and update its database accordingly. A log out from app will also clear current user from AUL.

§8.8 User & Device Information Database

The CA 1004 can maintain database information for each user and each device. For the user, the CA 1004 can maintain information related to User ID, login name, password, role (access list, department, organization), restrictions, updates, statistics, etc. For the device, the CA 1004 can maintain information such as device type, OS version, OS type, device model, applications, MAC address, etc. The CA 1004 can also maintain a list of apps installed on the device. For example, device_type codes could include:

00 Others
01 iPhone/iPod touch
02 iPad
03 Android Mobile
04 Android Tablet
05 Windows Mobile
06 Surface
07 Blackberry
08 Ubuntu Mobile
09 Desktop For example, OS type codes could include:
00 Others
01 iOS
02 Android OS
03 Windows Mobile OS
04 Blackberry OS
05 Ubuntu for Phone
06 Mac OS X
07 Windows
08 Linux The CA 1004 will maintain last User ID (LUI) per device to ensure that notification is delivered only to the associated device. LUI will be maintained in device info table by upon successful authentication.

§8.9 EUN Send and Handling

The delegate 1008 will be responsible to maintain a connection to proprietary notification servers from mobile OS such as APNS, GCM and WPNS and will handle the cloud systems 100, 500 direct or indirect notification URL API requests. The delegate 1008 also takes suppression information originated from the cloud systems 100, 500 and implement the logic accordingly.

§9.0 Design and Implementation

Figure 11:
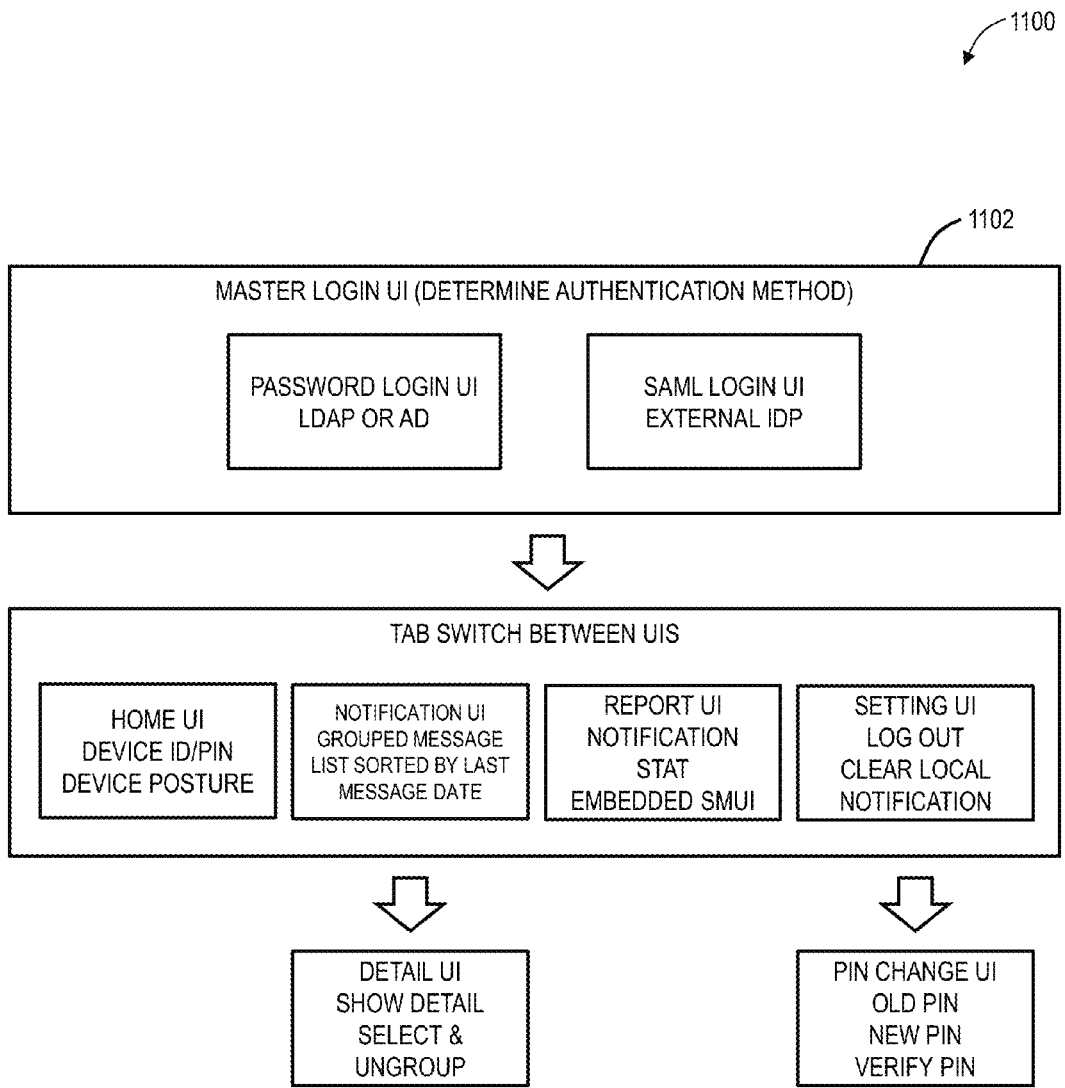
FIG. 11 is a block diagram of a user interface (UI) for the out of band notification system of FIG. 10.

Referring to FIG. 11, in an exemplary embodiment, a block diagram illustrates a user interface (UI) 1100 for the out of band notification system 1000 of FIG. 10. The UI 1100 includes a master login U 1102 with a username that determines a login mechanism per user configuration, namely either i) a Lightweight Directory Access Protocol (LDAP) or Active Directory (AD) password login UI or ii) a Security Assertion Markup Language (SAML) password login UI using an external Identity Provider (IDP).

For SAML, in general, when client tries to open any page, it redirects to a URL, e.g., gateway.zscaler.net and then user should fill username and if he/she is a SAML user, gateway does not ask for his password but redirects to a SAML server for authentication, then the custom SAML page does the authentication per company's implementation. In the secure agent 1002, after SAML detection, the login UI will be dismissed and username for company SAML implementation will be entered automatically, with which was entered from the previous login UI.

For the creation of device to User mapping, the CA 1004 performs the functions of 1) managing LLU (last login user) information after user authentication, 2) updating device posture information of in a device info table, 3) synchronizing with the CN 1006 with additional mobile notification related information in user configuration information, and 4) updating an array of app_ids on the device. The CA 1004 has an API with the secure agent 1002, e.g. HTTP (443) request with POST with contents and names and value pairs. The API can include command type and cookie information to 1) update device posture (command type=01): API will contain cookie and command type (=01) along with all device information of device info table except app_id array; 2) update installed App Ids (command type=02), and 3) a hash message authentication code (HMAC) for security.

The secure agent 1002 uses the HTTP API to talk to the CA 1004. All calls are made over https with POST method. The full protocol is described as follows. There are two end-points defined on the CA 1004, one for provisioning and registering a device and one for logging-out and de-registering a device (and its user). Provisioning end-point will be /dev_api/add. Method POST and on registration, the CA 1004 will add the device and return the device_id in the same request message format. Logout end-point will be /dev_api/del. Method POST and on logout, the CA 1004 will dis-associate the device and the user. Further transactions from this device will not be associated to this user (for logs or notification) until user does a re-provisioning. All messages will be in the form of multiple [type] [length] [value] triads. [2 byte Type] [2 byte Length] [Variable length value]. A protocol version type will identify the protocol the secure agent 1002 is talking with the CA 1004. In future, any major changes to the message protocol and the version number will could be incremented (e.g. device_type becomes string from integer). The CA 1004 can return error on a version mismatch. Any unknown type will be ignored and processing will move to next type (as long as versions are same) so that secure agent 1002 changes can be done independently without breaking the CA 1004 protocol.

Strings can be of variable-length without the '\0' character. Integers can be of 4-byte length, multi-byte data-types can use little-endian format, and all the command-types can be defined in a shared-header file and generated when the CA 1004 is built and shared by the mobile code. For example, to provision a device:
[PROTOCOL_VERSION][4][0x1][COOKIE_TYPE][13] [abcXXXxxxXXXD][TS_TYPE][4][0 x55051451] [DEV_TYPE][4][0x1][DEV_NAME][12][Joe's IPhone] etc.

The CA 1004 can perform the following actions when it receives the message. First, the CA 1004 will parse and validate the version and timestamp; the timestamp is expected to be in UNIX time format (so will be an integer type) and no more than 5 minutes of skew is allowed from current-time on the CA 1004. Next, a cookie is validated and userID is extracted from the cookie. The message is parsed and the device is updated or newly added. The notification key will be used to check if it is an device update or a new device provisioning—if notification_key exists, the CA 1004 will update the device with any changes needed for e.g. os_type, udid, lastuserid, jailbreak, etc.; or if the notification_key does not exist, the CA 1004 will create a new device record for this userid. (It is rare for the notification key to change for the same device).

After processing the message, the CA 1004 will either send a Success 200 OK message with the device_id or a 500 Internal Error with an error code. The secure agent 1004 should re-try provisioning on error. For de-provisioning, the CA 1004 will dis-associate the given userid and deviceid. A flush is sent to the CN 1006 to forget the dis-associated device's notification_key.

§9.1 iOS Global Proxy Configuration

The secure agent 1004 provisioning message will also be used to provision the iOS Global Proxy user & password. The device_id is the identity of the device; primary key in the CA 1004 database; and returned by the CA 1004 after provisioning of device. The device_login is the login_name that will be used for iOS Global Proxy authentication. It will be of the form <device_id>@<domain>. This will be returned from the CA 1004 after provisioning. For example, 1000@cokecce.com [1000 is device ID. cokecce.com is domain of the user]. The device_password is the auto-generated password for the device and is generated by the CA 1004 and returned after provisioning.

The CA 1004 will define an end-point for changing the device_password. /dev_api/chg Input will be the device_id, old device_password and the new device_password requested. Cookie and valid timestamp are required in the message.

§9.2 UI Flow

In FIG. 11, login UI flow will be two phases. Master login UI will determine the authentication mechanisms. Then either password login UI just like safe browser or SAML login UI will show. A Home UI will have copy button both for display ID and PIN. A Notification UI is be placed the second place in tab over report UI. It will show notification list grouped by app. The CN 1006 will set app name as "Other App" in case app mapping to user-agent is not discovered yet. A Detail UI will display the detail information of the latest message among selected app group. There is a "more message" button that leads to show the previous list of message. Upon selection among previous ones, detail information will be refreshed with selected previous message. There is also "email" button to share notification detail through email.

A Report UI, instead of showing stat from locally stored notification, it will embed UI like web UI to show stat from server. Local database will have only cached one which can be also deleted by user in setting UI so that it's not that useful stat. In setting UI, "Clear local notification" button will remain as in your document.

§10.0 Configuration

Again, the delegate 1008 connects to the mobile OS notification cloud 1010. The GCM Server will register android device and send registration ID to device. This registration ID will be forwarded by device to the CA 1004. Maximum size of registration ID can be 4 KB. For example, a registration ID will look like "APA91bHun4MxP5egoKMwt2KZFBaFUH-1RYqx . . . " To allow connectivity with GCM, Organization needs to open ports 5228, 5229 and 5230. GCM typically only uses 5228, but it sometimes uses 5229 and 5230. The delegate 1008 is able to fire off HTTPS requests to the GCM server. It should have API key to communicate with GCM and registration id to send notifications to particular device through GCM. API key should be included in the header of POST requests.

The following table provides exemplary details for the mobile OS notification cloud 1010:

|  | GCM | APNS | WPNS |
|---|---|---|---|
| Registration ID size | Can grow up to 4 KB, no fix size | 32 bytes as of now, but can grow up to 4K | URI is used as ID, size cannot exceeded 2055 bytes. |
| Ports to open | 5228, 5229, and 5230. GCM typically only uses 5228, but it sometimes uses 5229 and 5230. GCM doesn't provide specific IPs. It changes IPs frequently. | Transmission Control Protocol (TCP) port 5223 (used by devices to communicate to the APNs servers) TCP port 2195 (used to send notifications to the APNs) TCP port 2196 (used by the APNs feedback service) TCP Port 443 (used as a fall back on Wi-Fi only, when devices are unable to communicate to APNs on port 5223) The APNs servers use load balancing. Devices will not always connect to the same public IP address for notifications. The entire 17.0.0.0/8 address block is assigned to Apple, so it's best to allow this range in firewall settings. | For notification to work correctly for Windows Phone or iOS devices, firewall rules must allow port 443/TCP inbound and outbound and port 5223/TCP outbound. |

Figure 12:
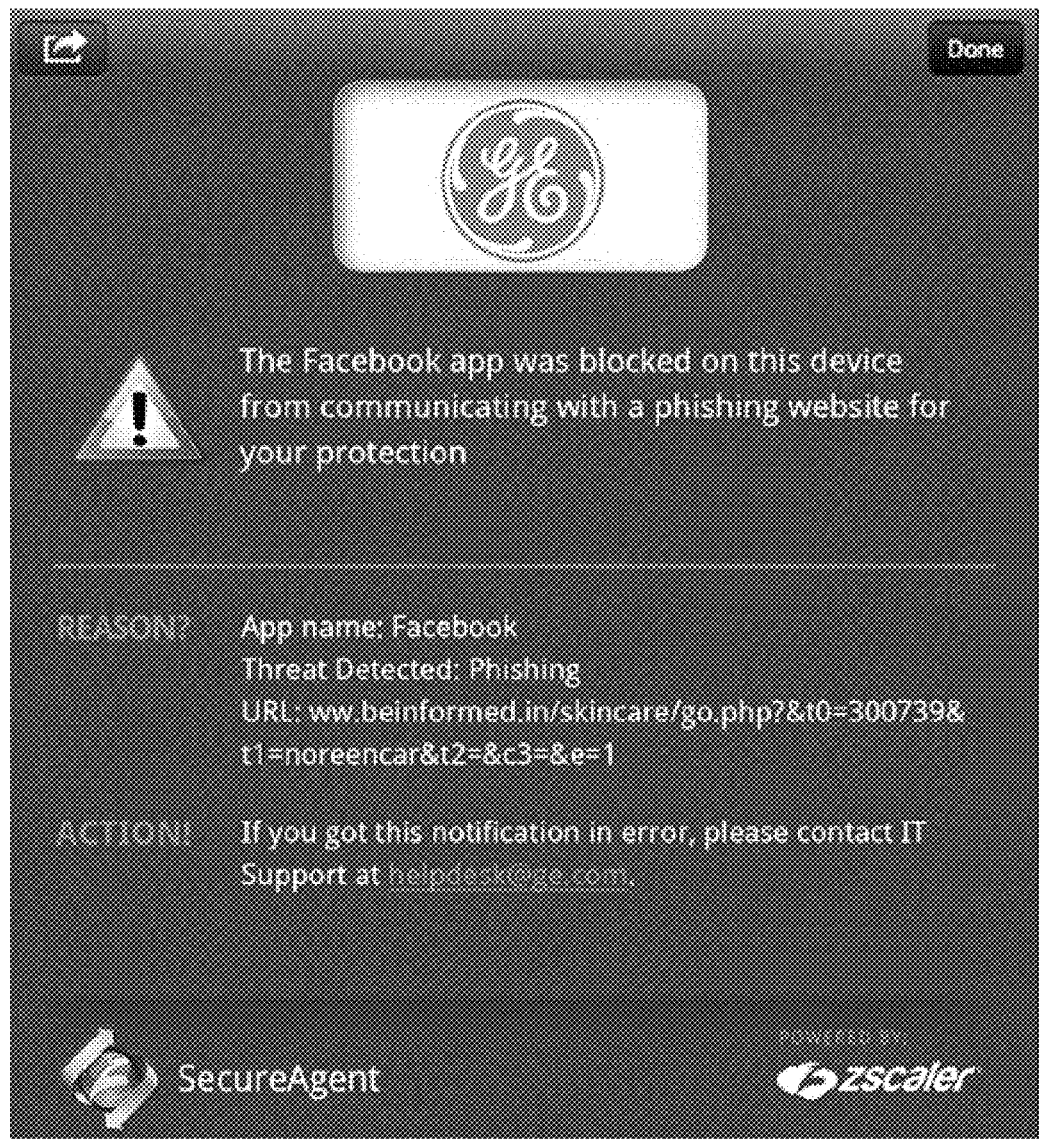
FIG. 12 is a screen shot of an exemplary out-of-band notification on a mobile device.

Referring to FIG. 12, in an exemplary embodiment, a screen shot illustrates an exemplary out-of-band notification to a mobile device. Note, the out-of-band notification provides the end user information as to what was blocked and why as well as contact information if the user believes that the block was in error.

§11.0 Secure and Lightweight Tunnel

The advent of mobile applications has burgeoned forth numerous challenges for network security systems, such as the cloud systems 100, 500 and the distributed security cloud 552. The conventional proxy based traffic forwarding solutions fail to identify and tag traffic to appropriate users, devices and mobile applications. Further in mobile platforms, forwarding all device traffic using a proxy is difficult because of limited system access. Also, enforcing app specific policies (such as allow/block, bandwidth control, etc.) is difficult for network security systems, as apps usually do not have unique user agents as compared to conventional browser based web surfing.

In various exemplary embodiments, the secure and lightweight traffic forwarding systems and methods include an agent app installed on the mobile device 400. This agent app can be the same as the agent 1002. The agent app works cooperatively with a secure cloud gateway, such as the cloud systems 100, 500, the distributed security cloud 552, the cloud system 904, etc., to listen for Web/DNS traffic to apply organizationally defined policies per user and per device on all outbound and inbound traffic, such as, for example, to block malware, block when request violates company security policy, etc. The agent app on the mobile device 400 opens local listening sockets, and reroutes outgoing requests (HTTP and User Datagram Protocol (UDP)) to local listening sockets, identify apps which originates those requests and then forward requests to secure cloud gateway with pertinent user and device information and application identification (such as unique app name) attached to request. Based on the configuration, the secure cloud gateway applies policies and sends responses to the agent that transduces the response back to the client app. In case of a remote policy violation, the agent app can receive an out of the bound end user notification as described herein. In case of a local policy violation (e.g., 3G quota exceed), the agent app can block the requests and show locally generated end user notifications. Such a traffic forwarding solution is scalable to the BYOD (Bring your own device) model of computing as well where only partial device or containerized traffic is forwarded to the secure web gateways.

Figure 13:
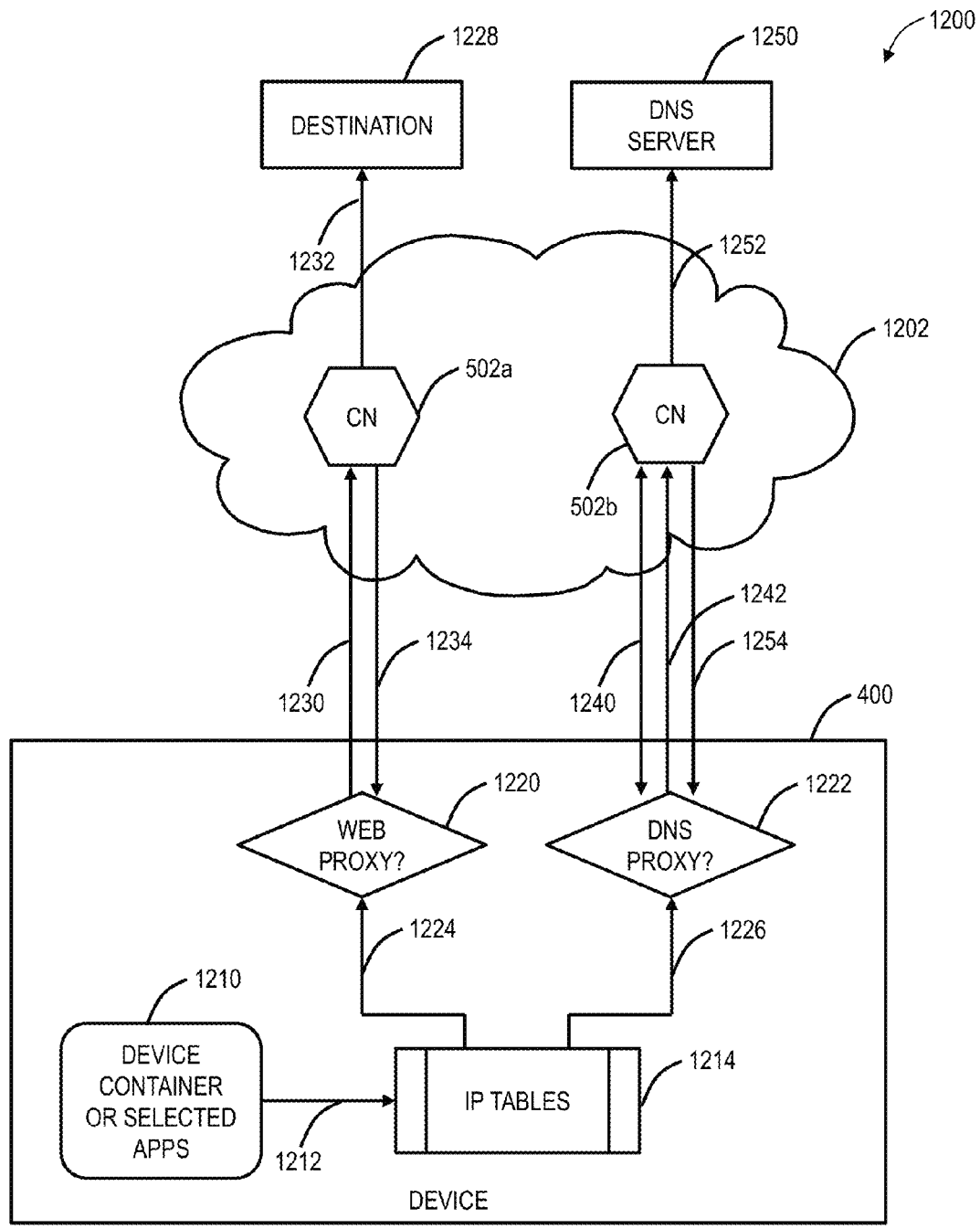
FIG. 13 is a network diagram of a secure and lightweight tunnel configuration between a mobile device and a cloud system.

Referring to FIG. 13, in an exemplary embodiment, a network diagram illustrates a secure and lightweight tunnel configuration 1200 between a mobile device 400 and a cloud system 1202. The cloud system 1202 can be any of the cloud systems 100, 500, the distributed security cloud 552, the cloud system 904, etc., and is illustrated with two exemplary cloud nodes 502. The secure and lightweight tunnel configuration 1200 is configured to provide 1) user enrollment and device authorization; 2) device wide or containerized traffic forwarding (Web/DNS) to the cloud system 1202 with appropriate user, device and application level information; 3) handling local policy configuration such as bandwidth control; and 4) handling end user notifications locally generated for a local device policy violation or remotely generated via a push notification cloud.

The secure and lightweight tunnel configuration 1200 includes a device container or selected apps 1210 on the mobile device 400 that communicates traffic 1212 to IP tables 1214. The device 400 can use the IP tables 1214 to communicate the traffic 1212 to the cloud system 1202 through a web proxy 1220 or DNS proxy 1222. For example, traffic 1224 can include port 80, 443 traffic, i.e. HTTP or HTTPS traffic 1224, and traffic 1226 can include port 53 traffic, i.e. DNS traffic 1226. The web proxy 1220 and the DNS proxy 1222 are processes or the like executed by the mobile device 400 to realize the secure and lightweight tunnel configuration 1200.

For the HTTP or HTTPS traffic 1224, the web proxy 1220 transmits the HTTP connection information (e.g., connect to a destination 1228) along with app information (associated with the HTTP or HTTPS traffic 1224) and digest information to the cloud node 502a (which can be a processing node 110 or the like) (step 1230). The cloud node 502, in the distributed security system, can forward the HTTP or HTTPS traffic 1224 if policy allows (step 1232) and enable establishment of a connection with the mobile device (step 1234).

For the DNS traffic 1226, the DNS proxy 1222 can either establish or already have established a socket passing client certificate authority information and device identification on a first DNS request (step 1240). The DNS proxy 1222 transmits a DNS request from the DNS traffic 1226 with app information and a unique request identifier to a cloud node 502b, which is acting to provide DNS augmented security (step 1242). The cloud node 502b queries a DNS server 1250 if policy allows (step 1252), and returns the DNS response, from the DNS server 1250, with the same unique request identifier (step 1254).

Referring to FIG. 14, in an exemplary embodiment, a screen diagram illustrates an exemplary UI for the secure and lightweight tunnel configuration 1200. Here, an administrator can configure policies for the mobile devices 400, such as policies including, without limitation, allowing or blocking transactions from apps that falls in certain categories like Malware, location, information leak, etc.; configuring SSL traffic interception for mobile devices; configuring out of bound end user notifications for mobile traffic; configuring 3G monthly quota for mobile devices; etc.

Figure 15:
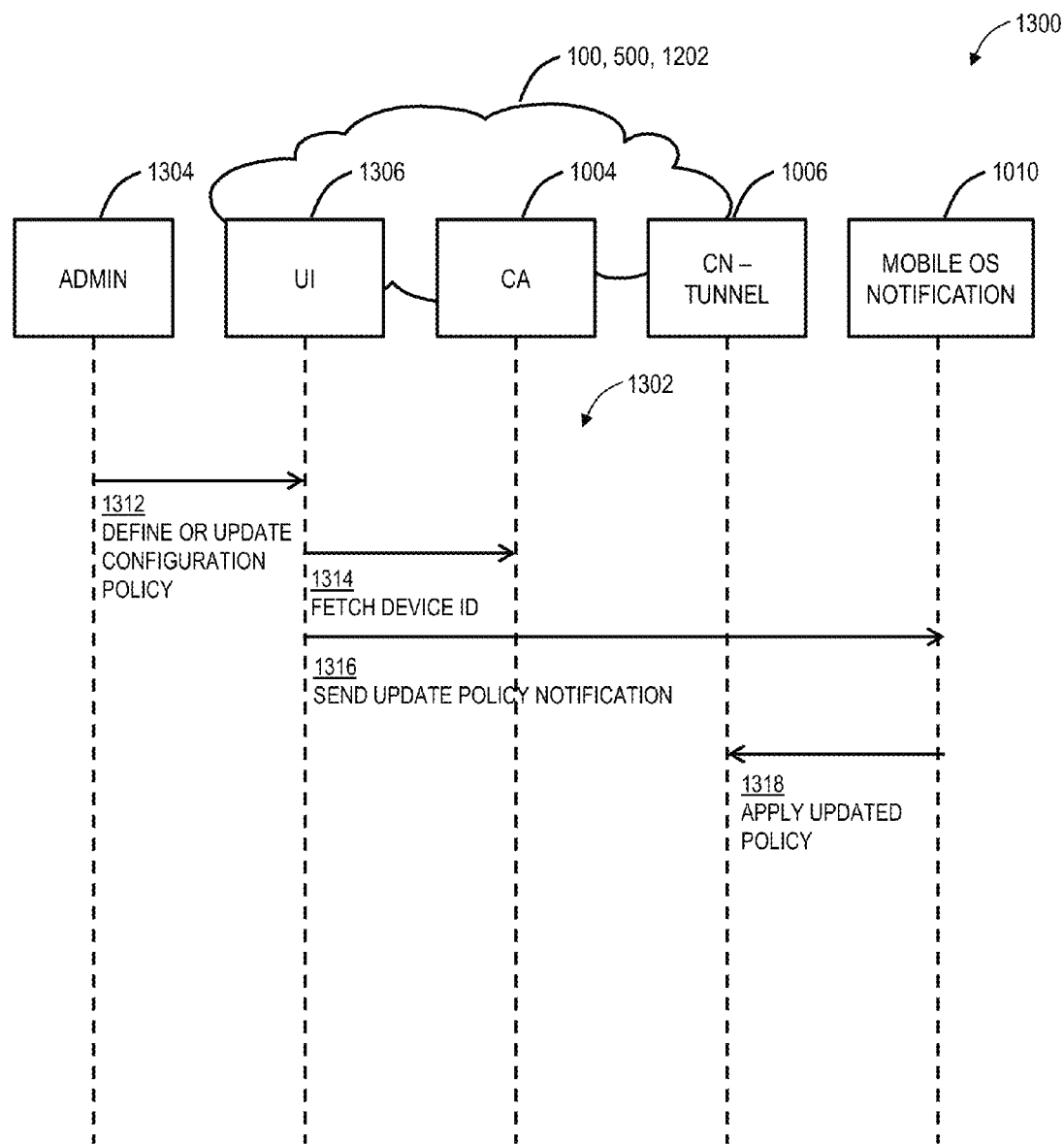
FIG. 15 is a flow diagram illustrates a policy configuration sequence system and method.

Referring to FIG. 15, in an exemplary embodiment, a flow diagram illustrates a policy configuration sequence system 1300 and method 1302. The system 1300 is similar to the notification system 1000 and includes an admin 1304, a UI 1306, a central authority (CA) 1004, a cloud node (CN) 1006, and a mobile operating system (OS) notification cloud 1010. Collectively, the devices 1004, 1006, 1306 can be part of the distributed security system 100, the cloud system 500, the distributed security cloud 552, the cloud system 904, the cloud system 1202, etc.

The policy configuration sequence system 1300 and method 1302 illustrates how the admin 1304 interacts with the secure and lightweight tunnel configuration 1200 to set policy. Note, the secure and lightweight tunnel configuration 1200 is described in FIG. 16 with reference to the user and the mobile device 400. The secure and lightweight tunnel configuration 1200 is configured to provide a secure and lightweight tunnel for external communications from the mobile device 400 through the cloud system 1202.

The admin 1304 can define or update a configuration policy through the UI 1306 (step 1312). The configuration policy can be for a user or group of users. Once defined, the UI 1306 fetches device identifiers from the CA 1004 for users impacted by the configuration policy (step 1314), and sends updated policy notifications, based on the configuration policy, through the mobile OS notification cloud 1010 (step 1316). The mobile OS notification cloud 1010 is configured to push the updated policy notifications to the associated devices 400, through the cloud node 1006 and the secure and lightweight tunnel configuration 1200 (step 1318).

Figure 16:
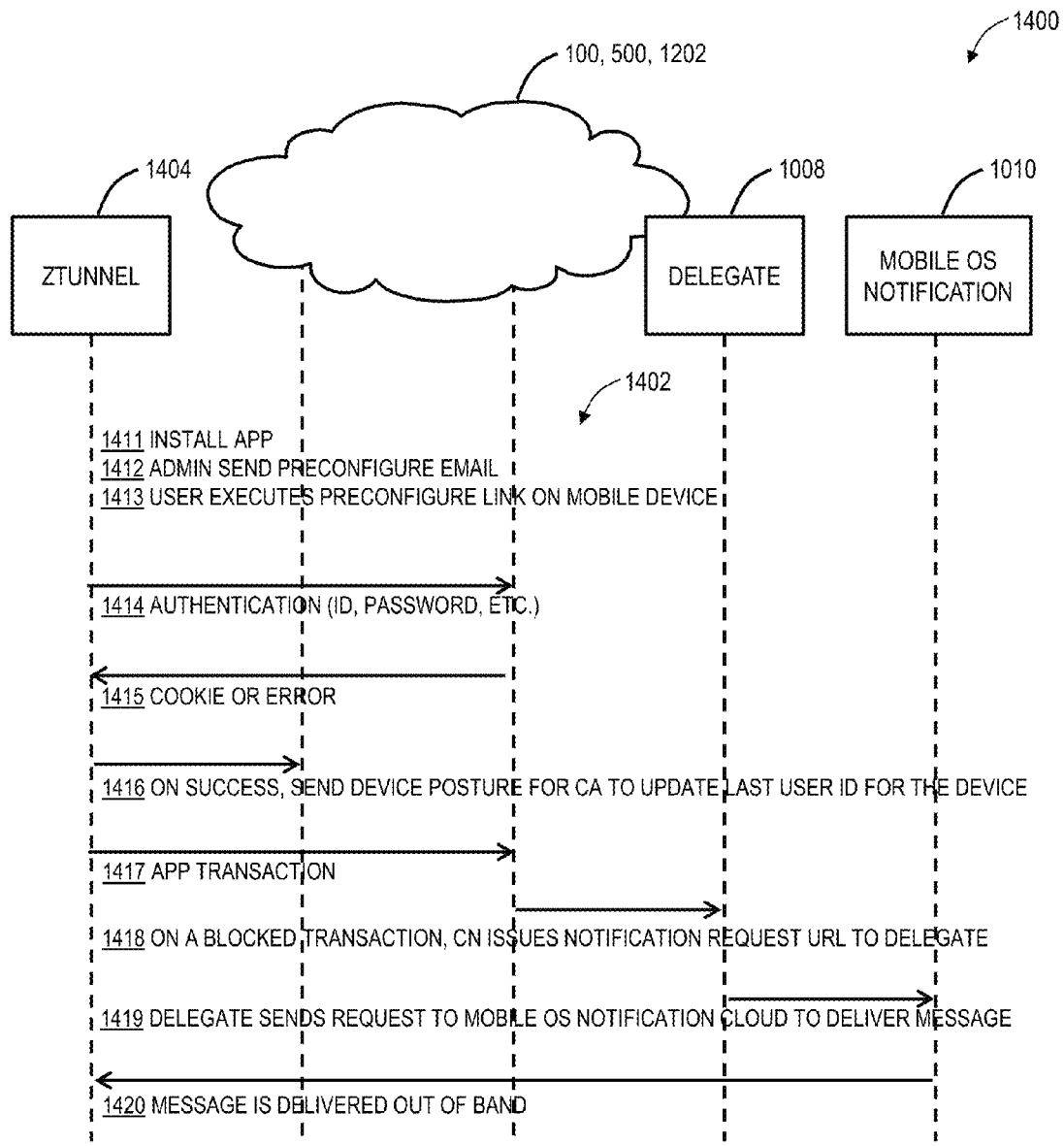
FIG. 16 is a flow diagram illustrates a user registration and notification system and method, with the secure and lightweight tunnel configuration.

Referring to FIG. 16, in an exemplary embodiment, a flow diagram illustrates a user registration and notification system 1400 and method 1402, with the secure and lightweight tunnel configuration 1200. Note, the user registration and notification system 1400 and method 1402 is similar to the notification system 1000, with the agent 1002 being replaced with a secure and lightweight tunnel configuration app 1404. The user registration and notification system 1400 includes the secure and lightweight tunnel configuration app 1400 at the mobile device 400, the central authority (CA) 1004, the delegate 1008, and the mobile operating system (OS) notification cloud 1010.

Note, the configuration app 1404 may be combined with the agent 1002. The configuration app 1404 is a software program or app that is installed and operated on the mobile device 400. The configuration app 1404 can have various functionality such as authentication with the systems 100, 500, end user notification (EUN), and the like. Additionally, the configuration app 1404 can be distributed or installed through mobile OS-specific mechanisms such as Google Play (Android Marketplace), Apple App Store, Windows Marketplace, etc. The CA 1004 is a central authority (CA) server which can be used by the systems 100, 500 to track users. The CN 1006 can be the processing node 110 in the system 100 or the cloud node 502 in the system 500.

The method 1402 includes installing the configuration app 1404, such as an app on the mobile device 400 (step 1041). This can be done via the mobile OS-specific mechanisms or the like. An administrator c a preconfigured email to the mobile device 400 (step 1412) and the user executes a preconfigured link or the like in the email on the mobile device 400 (step 1413). These steps configure the configuration app 1404 with the specific user and associated policy in the system 100, 500. Once configured and operating, the user can perform authentication such as with the configuration app 1404 through the cloud system 1202 (step 1414). The authentication can be anything known in the art, e.g. User ID and password, etc. The cloud system 1202 responds with a cookie (if successful) or error (if not successful) (step 1415). If the authentication is successful, a device posture is sent to the CA 1004 to update the last User ID for the mobile device 400 (step 1416). This is to create a User ID to IP binding as is described herein such that the system 100, 500 can know who is using the mobile device 400.

The method 1402 can include initiating a mobile app transaction, through the secure and lightweight tunnel configuration 1200 (step 1417). If the mobile app transaction complies with relevant policy, does not contain malware, etc., the method 1402 would end here and the mobile app transaction would be successful. If the mobile app transaction is not successful, e.g., blocked, cautioned, etc., the cloud system 1202 can send a notification request URL to the delegate 1008 (step 1418). The delegate 1008 sends the request to the mobile OS notification cloud 1010 (step 1419), and the message can be delivered to the mobile device out of band (step 1420).

§11.1 Traffic Rerouting Method—Secure and Lightweight Tunnel

Figure 17:
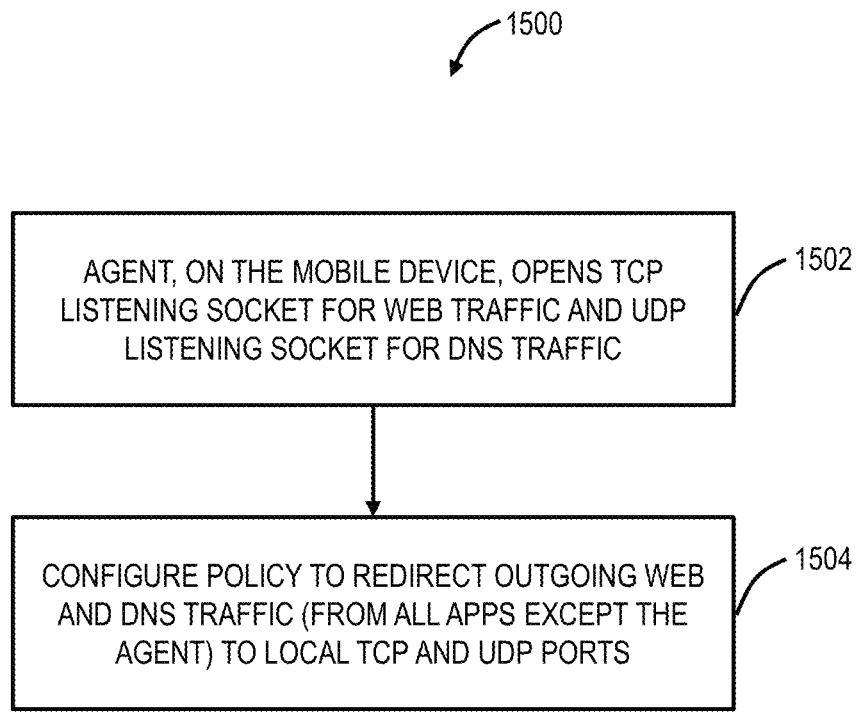
FIG. 17 is a flowchart illustrates a traffic rerouting method for the secure and lightweight tunnel configuration.

Referring to FIG. 17, in an exemplary embodiment, a flowchart illustrates a traffic rerouting method 1500 for the secure and lightweight tunnel configuration 1200. After registering the mobile device 400 with the cloud system 1202, the agent 1002 or the configuration app 1404 configures traffic redirection policies to forward traffic from the mobile device 400 to the cloud system 1202. The agent 1002 or the configuration app 1404 opens a listening socket and reroutes desired traffic to that socket. The agent 1002 or the configuration app 1404 opens a TCP listening socket for web traffic and UDP listening socket for DNS traffic (step 1502). The agent 1002 or the configuration app 1404 configures policy to redirect outgoing Web and DNS traffic (from all apps except the agent 1002 or the configuration app 1404) to the local TCP and UDP ports (step 1504).

For the traffic redirection, two approaches can be used—an IP tables 1214 firewall rules based approach or a tunnel interface approach. For the IP tables 1214 firewall rules based approach, the agent 1002 or the configuration app 1404 will configure firewall rules to reroute desired traffic to the local listening socket, TCP listening socket for web traffic and UDP listening socket for DNS traffic. For example, for Web/HTTP tunneling, the agent 1002 or the configuration app 1404 configures a forwarding rule to reroute traffic destined to port 80 and 443 to 127.0.0.1:zz where zz is agent's listening TCP socket port. For DNS tunneling, the agent 1002 or the configuration app 1404 configures a forwarding rule to reroute traffic destined to port 53 to 127.0.0.1:zz where zz is agent's listening UDP socket port.

Figure 18:
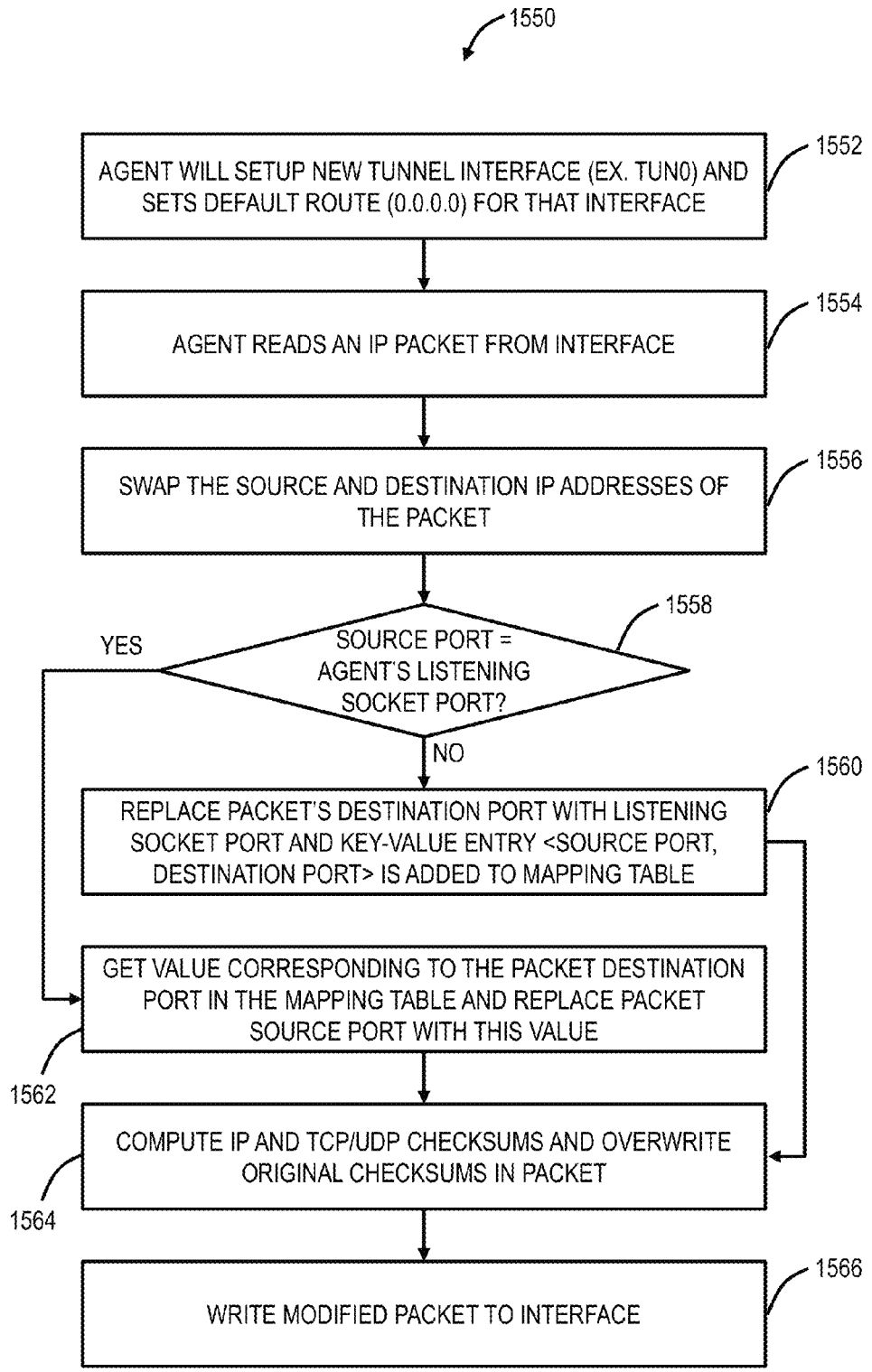
FIG. 18 is a flowchart illustrates a tunnel interface approach for the traffic redirection in the traffic rerouting method.

Referring to FIG. 18, in an exemplary embodiment, a flowchart illustrates a tunnel interface approach 1550 for the traffic redirection in the traffic rerouting method 1500. The agent 1002 or the configuration app 1404 will setup a new tunnel interface (ex. tun0) and with a default route (0.0.0.0) set for that interface (step 1552). The agent 1002 or the configuration app 1404 reads an IP packet from the interface (step 1554). The agent 1002 or the configuration app 1404 swaps the source and destination IP addresses (step 1556). If the packet's source port is not equal to the agent's listening socket port (step 1558), the agent 1002 or the configuration app 1404 replaces the packet's destination port with the listening socket port and a key-value entry <source port, destination port> is added to a mapping table (step 1560). If the packet's source port is equal to the agent's listening socket port (step 1558), the agent 1002 or the configuration app 1404 gets the value corresponding to the packet destination port in the mapping table and replaces the packet source port with this value (step 1562). Subsequent to the steps 1560m 1562, the agent 1002 or the configuration app 1404 computes IP and TCP/UDP checksums and overwrite the original checksums in the packet (step 1564) and writes the modified packet to the interface (step 1566). The steps 1556-1566 can be performed for every packet read from the interface.

For example, let x.x.x.x be an IP address of a tunnel interface and zz be a local listening socket port.

| Original Packet | Modified Packet |
| --- | --- |
| Request packet from client app: | SRC: y.y.y.y:xx |
| SRC: x.x.x.x:xx | DEST: x.x.x.x:zz |
| DEST: y.y.y.y:yy | Entry added to mapping table: <xx,yy> |
| Response packet from listening socket: | Entry fetched from mapping table for key xx is yy |
| SRC: x.x.x.x:zz DEST: y.y.y.y:xx | SRC: y.y.y.y:yy |
| | DEST: x.x.x.x:xx |

§11.2 Reading Traffic and Applying Local Policies—Secure and Lightweight Tunnel

Figure 19:
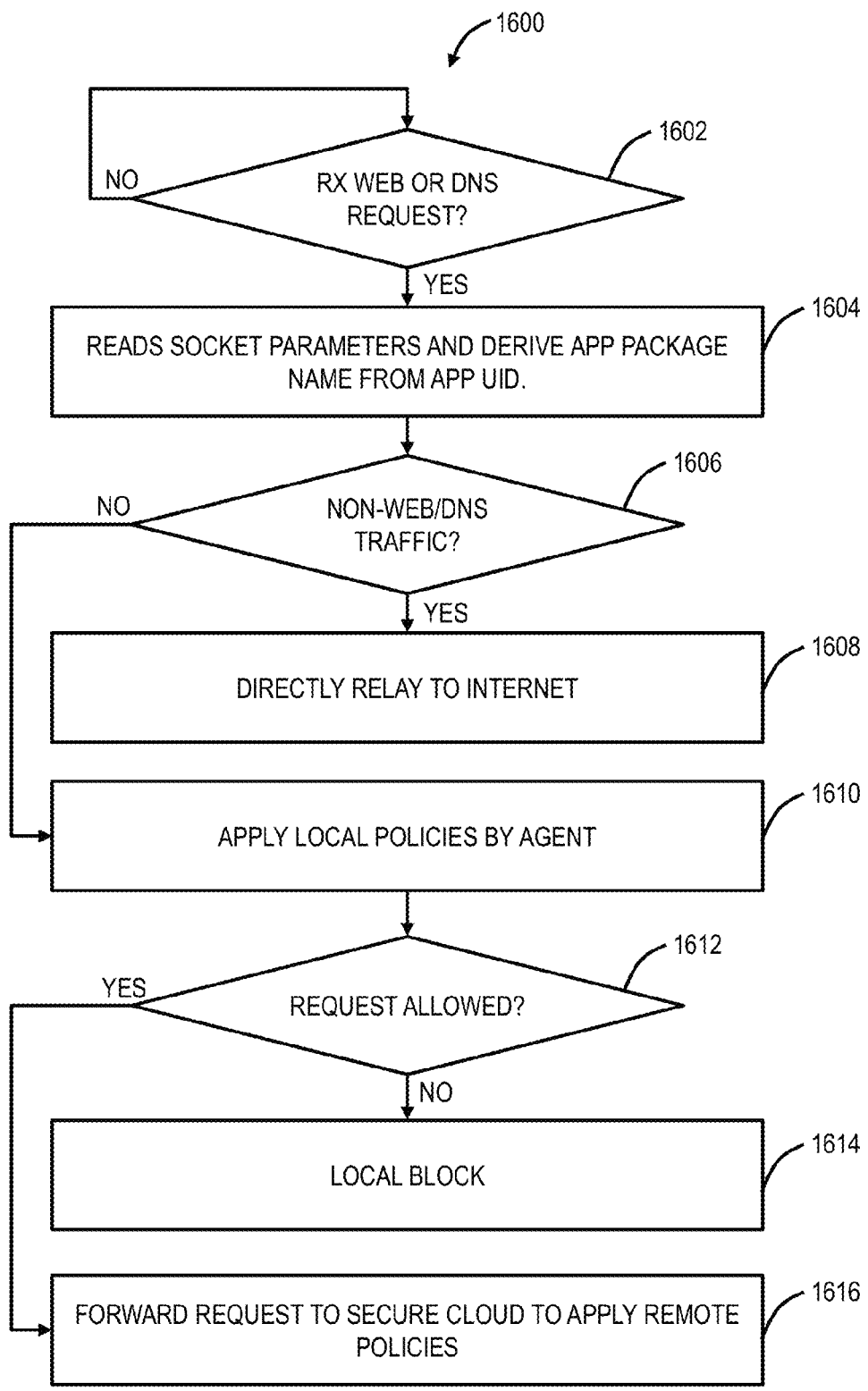
FIG. 19 is a flowchart illustrates a local policy method, with the secure and lightweight tunnel configuration.

Referring to FIG. 19, in an exemplary embodiment, a flowchart illustrates a local policy method 1600, with the secure and lightweight tunnel configuration 1200. The local policy method 1600 can be implemented via the agent 1002 or the configuration app 1404 operating at the mobile device 400. When any mobile device app tries to make Web or DNS requests, the agent's TCP and UDP listening sockets will receive the corresponding Web and DNS requests (step 1602). On receiving a request, the agent 1002 or the configuration app 1404 reads socket parameters i.e. local and remote IP/port of socket and unique identifier (UID) of process to which the socket belongs, and the agent 1002 or the configuration app 1404 then derives app package name from the app UID (step 1604). For non-Web/DNS traffic (step 1606), the agent 1002 or the configuration app 1404 directly relays the request out to the Internet (step 16108). For Web/DNS traffic (step 1606), the agent 1002 or the configuration app 1404 first applies local policies (step 1610). For example, a particular app is not allowed to browse due to a bandwidth quota limit. If the request is not allowed based on the local policies (step 1612), then there is a local block/traffic drop at the mobile device (step 1614). Otherwise, the agent 1002 or the configuration app 1404 forwards the request to the secure cloud to apply remote policies (step 1616).

After a request passes local policies, the agent 1002 or the configuration app 1404 forwards request to cloud to apply remote policies. The forwarding request step can be for a Web/HTTP request or a DNS request. For a Web/HTTP request, the agent 1002 or the configuration app 1404 opens and outgoing socket to the secure cloud gateway for each accepted local socket. The agent 1002 or the configuration app 1404 writes HTTP Connect destination_IP:Port to the outgoing socket and passes app identification (app unique package name, app version, OS version, device model, agent app version, etc.) in a User-Agent header and passes device login credentials for digest authentication with the secure cloud gateway. For example, a request could be: Example request:

CONNECT 68.178.230.53:80 HTTP/1.1
Host: 68.178.230.53:80
User-Agent: com.sec.android.app.sbrowser/1528 Android/ 4.4.2
SAMSUNG-GT-19505 ZTunnel/1.0
Connection: Keep-Alive
Proxy-Authorization: Digest . . .

The secure cloud accepts the request if digest credentials are valid and establishes the tunnel. The agent 1002 or the configuration app 1404, on receiving success, reads request data from an accepted client socket and writes that data to the outgoing socket. The secure cloud reads app request, applies policies and sends response back. The agent 1002 or the configuration app 1404 reads response data from the tunnel and writes the data back to client socket.

For a DNS request, the agent 1002 or the configuration app 1404 opens an outgoing TLS socket/tunnel with a secure cloud DNS service passing client certificate, device IS, authentication information, security level, etc. The agent 1002 or the configuration app 140 accepts DNS requests on the local listening socket. On receiving a DNS request, it accepts request and reads DNS packet data, and the makes a custom DNS request by assigning a unique ID to the original DNS request, adding application information to the request (app unique package name, app version, etc.). The agent adds a mapping table entry <unique req ID, client socket> and then writes the custom request to the outgoing tunnel. The secure cloud reads request, triggers per user/app policies, and sends a DNS response back with same req ID. If a block is trigger, the secure cloud sends its own webserver IP, else it resolves the DNS request and sends the actual IP. The agent reads the response from the outgoing tunnel, gets an entry from mapping table corresponding to unique req ID and sends the DNS response back to client app. The agent also parses the DNS response and in case of block response shows locally generated notification as explained below.

Figure 20:
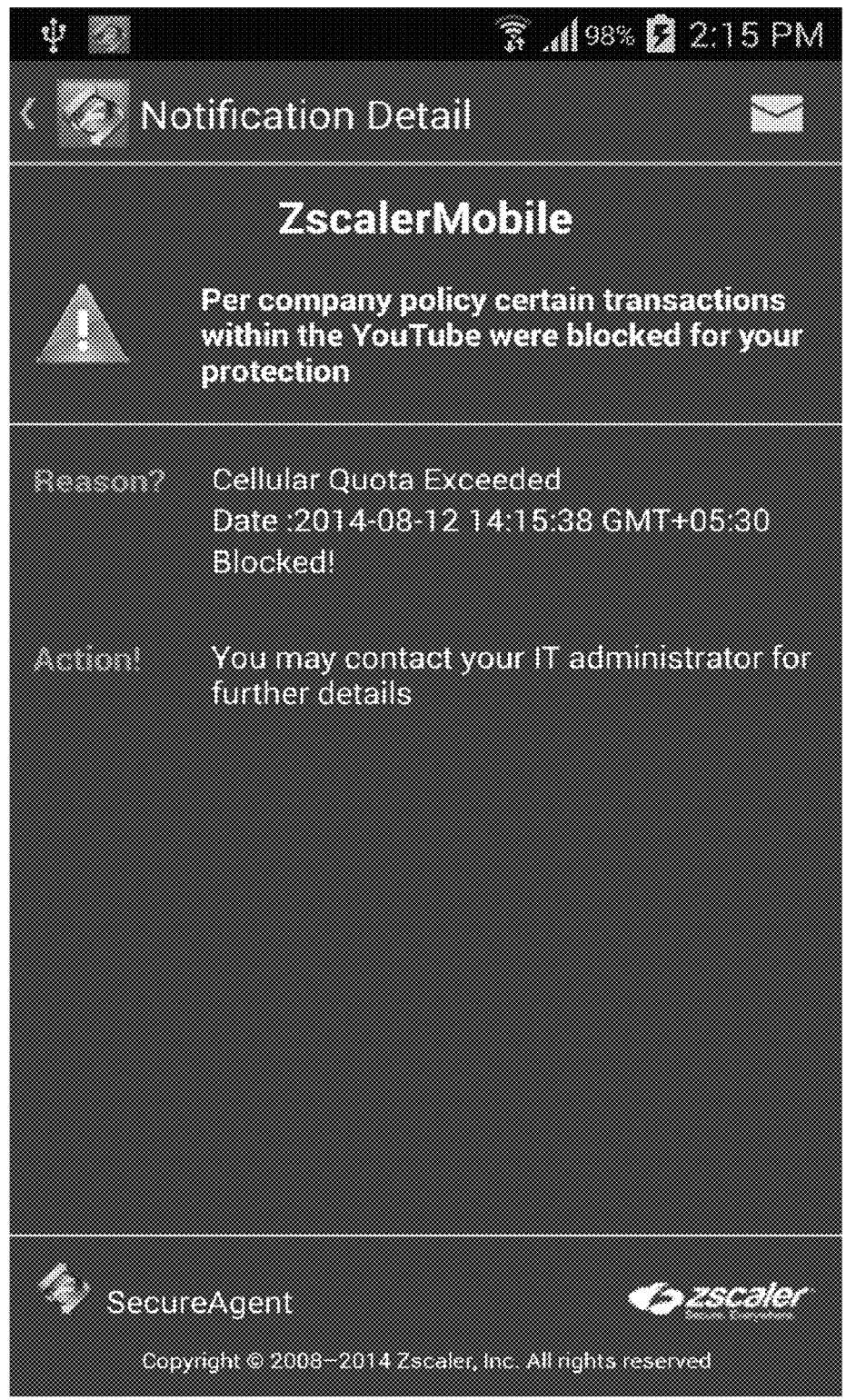
FIG. 20 is a mobile screen shot of a locally triggered end user notification.
Figure 21:
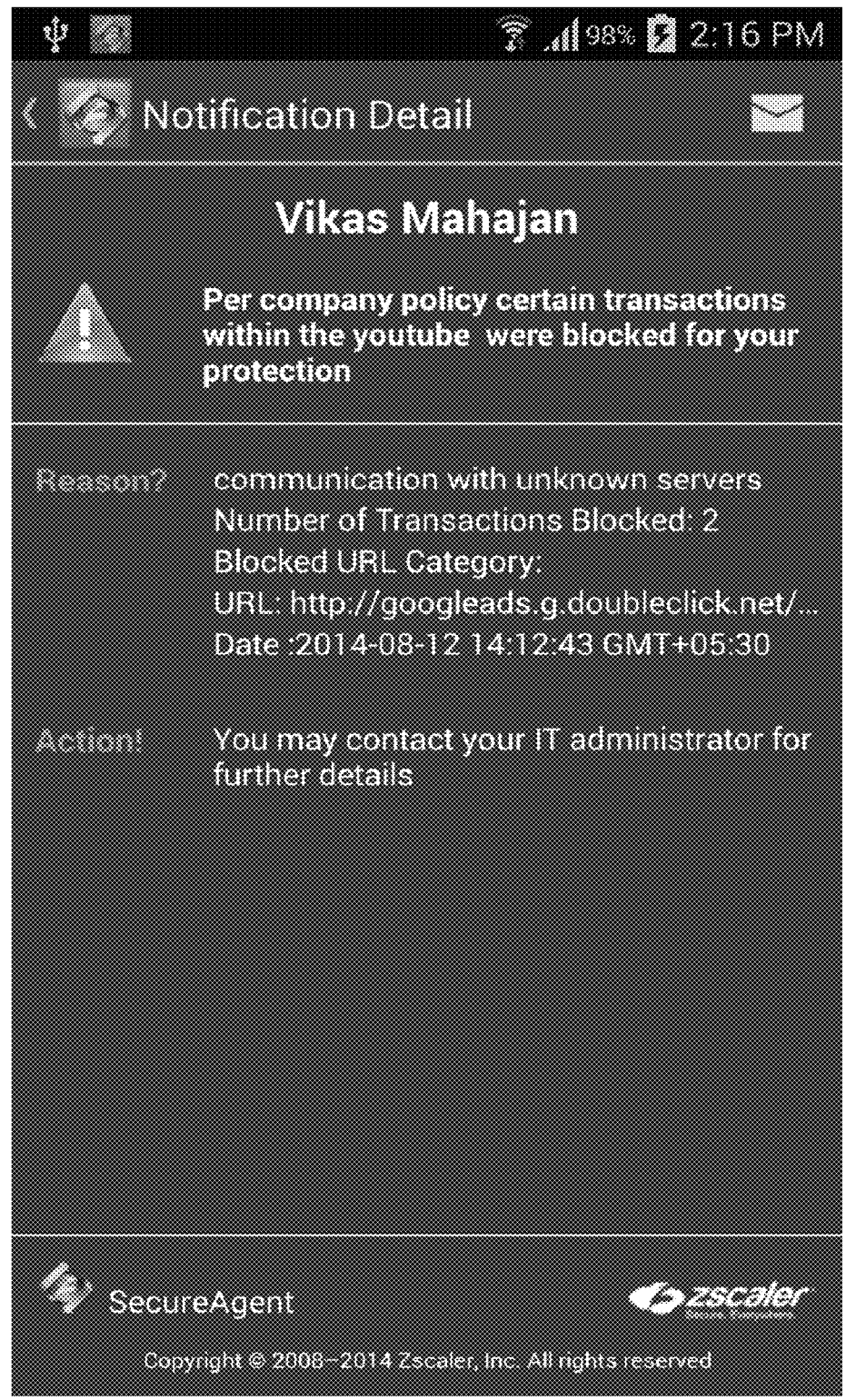
FIG. 21 is a mobile screen shot of a remotely triggered end user notification.

Referring to FIGS. 20 and 21, in an exemplary embodiment, mobile screen shots illustrate a locally triggered end user notification (FIG. 20) and a remotely triggered end user notification (FIG. 21). If a request was blocked due to local policy such as due to bandwidth quota limit, the agent shows locally generated notification, such as illustrated, for example, in FIG. 20. If the request was blocked by the secure cloud, it sends out of bound notification to mobile device i.e. it sends notification to delegate server which sends it to appropriate server (APNS/GCM) which then sends Push notification to device, such as illustrated in FIG. 21.

Figure 22:
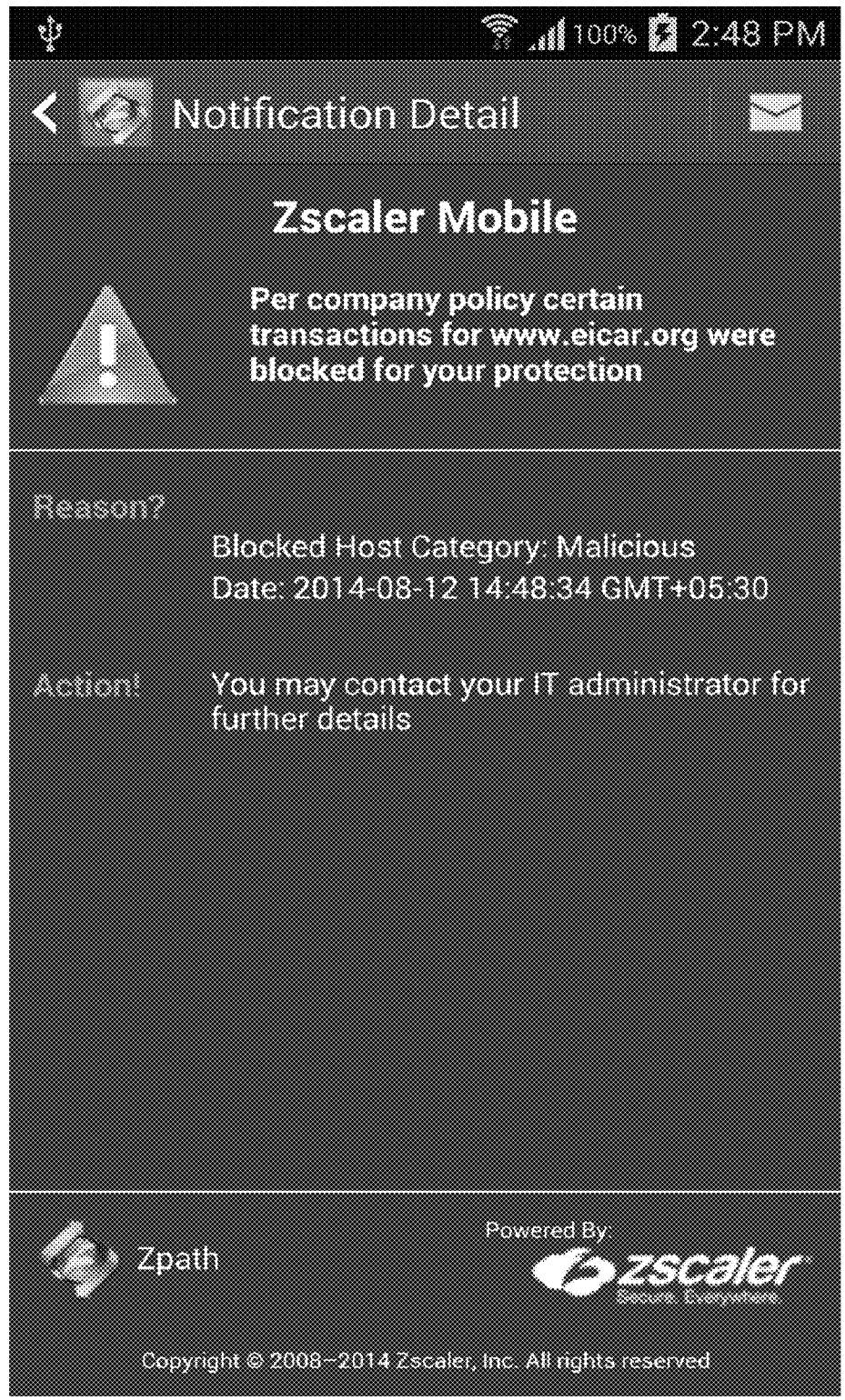
FIG. 22 is a mobile screen shot of a locally generated DNS block notification.

Referring to FIG. 22, in an exemplary embodiment, a mobile screen shot illustrates a locally generated DNS block notification. If a request was blocked, the secure cloud resolves DNS request to the IP of its own web server (block IP). The agent checks for response IP in the DNS response. If block IP is returned, the agent generates local notification data and shows End user notification UI, such as shown in FIG. 22.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method implemented by an agent operating on a mobile device communicating to a cloud-based system, the method comprising:
  opening up local listening sockets on the mobile device;
  redirecting outgoing traffic from all applications on the mobile device except the agent to the local listening sockets; and
  forwarding the outgoing traffic from the local listening sockets to the cloud-based system with additional information included therein for the cloud-based system.

2. The method of claim 1, wherein the local listening sockets are a Transmission Control Protocol (TCP) listening socket for Web traffic and a User Datagram Protocol (UDP) listening socket for Domain Name System (DNS) traffic.

3. The method of claim 1, wherein the redirecting outgoing traffic comprises using an Internet Protocol (IP) tables, firewall rules-based approach where the agent configures firewall rules to reroute the outgoing traffic to the local listening sockets.

4. The method of claim 1, wherein the redirecting outgoing traffic comprises using a tunnel interface approach using a tunnel interface to reroute the outgoing traffic to the local listening sockets.

5. The method of claim 1, further comprising:
  applying local policies at the mobile device, through the agent, prior to forwarding the outgoing traffic.

6. The method of claim 5, wherein the cloud-based system is configured to apply remote policies subsequent to the forwarding the outgoing traffic.

7. The method of claim 5, further comprising:
blocking an outgoing request based on the outgoing traffic based on the local policies and displaying a locally generated end user notification.

8. The method of claim 5, wherein the local policies comprise bandwidth quota limits.

9. The method of claim 1, wherein the additional information comprises any of app unique package name, app version, operating system version, device model, and agent app version.

10. A mobile device, comprising:
a network interface communicatively coupled to a network, a processor communicatively coupled to the network interface, and memory storing instructions that when executed cause the processor to:
open up local listening sockets on the mobile device;
redirect outgoing traffic from all applications on the mobile device except an agent to the local listening sockets; and
forward the outgoing traffic from the local listening sockets to a cloud-based system with additional information included therein for the cloud-based system.

11. The mobile device of claim 10, wherein the local listening sockets are a Transmission Control Protocol (TCP) listening socket for Web traffic and a User Datagram Protocol (UDP) listening socket for Domain Name System (DNS) traffic.

12. The mobile device of claim 10, wherein the outgoing traffic is redirected using an Internet Protocol (IP) tables, firewall rules-based approach where the agent configures firewall rules to reroute the outgoing traffic to the local listening sockets.

13. The mobile device of claim 10, wherein the outgoing traffic is redirected using a tunnel interface approach using a tunnel interface to reroute the outgoing traffic to the local listening sockets.

14. The mobile device of claim 10, wherein the memory storing instructions that when executed further cause the processor to:
apply local policies at the mobile device, through the agent, prior to forwarding the outgoing traffic.

15. The mobile device of claim 14, wherein the cloud-based system is configured to apply remote policies subsequent to the forwarding the outgoing traffic.

16. The mobile device of claim 14, wherein the memory storing instructions that when executed further cause the processor to:
block an outgoing request based on the outgoing traffic based on the local policies and displaying a locally generated end user notification.

17. The mobile device of claim 14, wherein the local policies comprise bandwidth quota limits.

18. The mobile device of claim 14, wherein the additional information comprises any of app unique package name, app version, operating system version, device model, and agent app version.

* * * * *